(12) United States Patent
Kitamura et al.

(10) Patent No.: US 7,479,524 B2
(45) Date of Patent: Jan. 20, 2009

(54) PROCESS FOR PRODUCING AQUEOUS RESIN DISPERSIONS

(75) Inventors: Takashi Kitamura, Hiratsuka (JP); Keiichiro Saikawa, Hiratsuka (JP); Kenichi Tomita, Hiratsuka (JP); Takeshi Inoue, Hiratsuka (JP); Kenya Suzuki, Hiratsuka (JP); Hiromi Harakawa, Hiratsuka (JP); Masami Sugishima, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 540 days.

(21) Appl. No.: 10/546,070

(22) PCT Filed: Feb. 18, 2004

(86) PCT No.: PCT/JP2004/001781

§ 371 (c)(1),
(2), (4) Date: Aug. 18, 2005

(87) PCT Pub. No.: WO2004/074327

PCT Pub. Date: Sep. 2, 2004

(65) Prior Publication Data

US 2006/0167178 A1    Jul. 27, 2006

(30) Foreign Application Priority Data

Feb. 19, 2003  (JP) ............................ 2003-041376
Mar. 7, 2003   (JP) ............................ 2003-061341

(51) Int. Cl.
*C08L 33/00* (2006.01)

(52) U.S. Cl. .................. 524/819; 524/773; 524/823; 524/832; 524/833

(58) Field of Classification Search ............. 524/773, 524/819, 823, 832, 833
See application file for complete search history.

(56) References Cited

U.S. PATENT DOCUMENTS 3,988,273 A    10/1976  Tetsuo et al.
4,312,797 A    1/1982   Aihara et al.
6,177,510 B1 * 1/2001   Saam ........................ 524/773
7,157,526 B2 * 1/2007   Nickolaus et al. ......... 525/445
2004/0180146 A1 * 9/2004  Saikawa et al. .......... 427/407.1

FOREIGN PATENT DOCUMENTS

| EP | 1 044 993 A1 | | 10/2000 |
|---|---|---|---|
| JP | 50-126723 | | 10/1975 |
| JP | 56-5863 | | 1/1981 |
| JP | 59-008773 | | 1/1984 |
| JP | 60040175 A | * | 3/1985 |
| JP | 60-81252 A | | 5/1985 |
| JP | 60-221469 | | 11/1985 |
| JP | 61-64329 A | | 4/1986 |
| JP | 61064329 A | * | 4/1986 |
| JP | 61-204211 A | | 9/1986 |
| JP | 2000-95980 A | | 4/2000 |
| JP | 2000-226537 A | | 8/2000 |
| JP | 2003-231859 A | | 8/2003 |
| JP | 2003231859 A | * | 8/2003 |
| WO | WO02006452 A1 | * | 8/2002 |

OTHER PUBLICATIONS

Handbook of Fillers—A Definitive User's Guide and Databook (2nd Edition), Wypych, George © 2000 ChemTec Publishing.*
JP 2003231859 A, Aug. 2003, Saikawa et al. Machine translation.*
JP 60040175 A, Mar. 1985, Derwent Abstract.*
P 61064329 A, Apr. 1986, English Translation, Hosogane et al.*

* cited by examiner

*Primary Examiner*—Bernard Lipman
(74) *Attorney, Agent, or Firm*—Wenderoth, Lind & Ponack, L.L.P.

(57) ABSTRACT

This invention provides a process for producing an aqueous resin dispersion in which the average particle diameter of the dispersed resin is not more than 500 nm, comprising finely dispersing a monomeric mixture (I) containing (A) fatty acid-modified polymerizable unsaturated monomer and (B) other polymerizable unsaturated monomer which is copolymerizable with the monomer (A) in an aqueous medium in such a manner that the dispersed particles have an average particle diameter not more than 500 nm, and polymerizing the resulting emulsified product. The invention also provides aqueous resin compositions which comprise the aqueous resin dispersions, and water-based paint compositions which comprise the aqueous resin compositions.

42 Claims, No Drawings

PROCESS FOR PRODUCING AQUEOUS RESIN DISPERSIONS

TECHNICAL FIELD

This invention relates to a process for producing aqueous resin dispersions which can form coating film of excellent drying property with both thick appearance and high gloss; aqueous resin compositions which contain the aqueous resin dispersions; and water-based paint compositions which contain the aqueous resin compositions.

BACKGROUND ART

Recently shift from organic solvent-based compositions to water-based compositions in the art of paint, ink, adhesive and the like is under progress, for conservation of natural resources, environmental sanitation, prevention of pollution and provision of non-dangerous products. For example, as vehicles used in water-based paint compositions, for example, resins such as alkyd resin, acrylic resin, polyester resin, polyurethane resin, epoxy resin and the like can be named. When unsaturated fatty acid is used as a starting material of alkyd resin, oxidation-hardenable groups can be introduced into the resin's skeletal structure, and when such alkyd resin is used as a vehicle of water-based paint compositions, the compositions can be one-liquid cold set. Also due to oiliness of the resin, the water-based paint compositions are expected to exhibit anti-corrosive effect when they are applied onto metallic surfaces. The resin's softness, however, retards drying of the coated film, which generally results in low weatherability. On the other hand, acrylic resin is quick-drying and highly weather-resistant but is inferior in corrosion resistance. As a resinous material for the aqueous system which concurrently exhibits the characteristic properties of these two kinds of resins, graft resins formed by binding alkyd resins and acrylic resins by chemical reaction have been developed and many proposals were made. For example, JP Sho 50 (1975)-126723A, JP Sho 56 (1981)-5863A and Sho 60 (1985)-221469A disclosed a method for producing aqueous solutions or dispersions of such resins, which comprised making a fatty acid-modified monomer through reaction of unsaturated fatty acid having non-conjugated double bond with glycidyl ester of $\alpha,\beta$-ethylenically unsaturated acid, copolymerizing the fatty acid-modified monomer with unsaturated monomer such as $\alpha,\beta$-ethylenically unsaturated carboxylic acid in organic solvent, neutralizing the carboxyl groups in the resulting resin with basic substance, and thereafter diluting the resin with water. However, those hydrophilic resins according to the method are prepared through solution polymerization, and the formed polymers must be dissolved in organic solvent. Hence it is generally difficult to give them high molecular weight. Furthermore, for dissolving or dispersing the formed polymers in water, monomers having hydrophilic groups such as carboxyl or hydroxyl groups, or an emulsifier must be used in large quantities. In consequence, coating films formed of the polymers are subject to a problem of insufficient water resistance.

JP Sho 59 (1984)-8773A disclosed preparation of an oxidative polymerization type aqueous emulsion by emulsion polymerization of a radical-polymerizable monomeric mixture using a surfactant and/or high molecular protective colloid. The monomeric mixture contained a fatty acid-modified monomer which was obtained through a reaction of a drying oil fatty acid or semi-drying oil fatty acid with glycidyl ester of $\alpha,\beta$-etylenically unsaturated acid.

The formation mechanism of an emulsion polymer is such that the participating monomer(s) diffuse in water from large monomer drops present in the aqueous phase, and the polymerization progresses in the micelles formed by surfactant, to produce polymer particles (small particles under polymerization). In that occasion, the monomer(s) used for the polymerization must be supplied under the polymerization conditions, from the monomer drops to the polymer particles, as they diffuse and migrate in the water.

There are generally large differences in particle diameter between the monomer drops and the polymer particles growing from the micelles. This means there is large difference between the total surface area of the monomer drops and that of the polymer particles, and therefore initiator radicals or the monomer(s) diffusing in the water penetrate into those of the greater surface area, i.e., into the polymer particles and the polymerization progresses in situ. During the emulsion polymerization, the polymer particles grow as their diameters gradually increase.

In the occasion of emulsion polymerizing the radical-polymerizable mixture containing the fatty acid-modified monomer, the fatty acid-modified monomer having a very low water-solubility is left in the monomer drops at the polymerization stage, and the polymerization progresses in the monomer drops, producing polymer particles containing many of the fatty acid-modified monomer units. On the other hand, the monomer(s) other than the fatty acid-modified monomer diffuse in the water from the monomer drops into the micelles to form polymer particles containing many units of the monomer(s) other than the fatty acid-modified monomer. Thus, in high probability drastically irregular distribution of hydrophilic polymer particles and hydrophobic polymer particles occurs in the finally obtained emulsion. In consequence, coating films formed from above-described oxidative polymerization type aqueous emulsions have such problems that the hydrophobic polymer particles provide nuclei to cause cissing, or they come up to the surface to retain tackiness at the surface, or due to their incompatibility transparent film cannot be obtained to markedly impair appearance of the finished coating film.

As a measure to overcome those problems as above, EP-A-1044993 proposed aqueous copolymers containing a copolymer which was a polymerization product of vinyl monomers and a hydrophobic ester or partial ester, and their production process. The publication proposed addition of a hydrophobic ester from drying oil acid and polyol to the monomer drops at the polymerization time, to inhibit formation of second generation particles other than the monomer drops. The aqueous copolymers that are described in the publication do not contain volatile fusion assistant and form transparent film, but they are slow drying particularly at the initial stage after application. In actual use the coating film from the copolymers retains tackiness. The coating film is also subject to such defects that its weatherability and water resistance are insufficient.

DISCLOSURE OF THE INVENTION

The main object of the present invention is to provide a process for stably producing an aqueous resin dispersion by emulsion polymerization of a monomeric mixture containing a fatty acid-modified polymerizable unsaturated monomer or monomers, and other polymerizable unsaturated monomer or monomers which are copolymerizable therewith.

We have engaged in concentrative studies for accomplishing the above object, and now discovered that an aqueous resin composition which exhibits both polymerization stability and storage stability and which forms coating film having excellent water resistance, weatherability and so an can be obtained by a process comprising finely dispersing a monomeric mixture containing a fatty acid-modified polymerizable monomer(s), such that a specific average particle diameter is attained, and polymerizing the resulting monomeric emulsified product. Still more preferably, as the monomeric emulsified product, one of specific monomeric composition is selected. The present invention is whereupon completed.

Thus, the present invention provides a process for producing an aqueous resin dispersion in which the average particle diameter of the dispersed resin is not more than 500 nm, comprising finely dispersing a monomeric mixture (I) containing (A) fatty acid-modified polymerizable unsaturated monomer and (B) other polymerizable unsaturated monomer which is copolymerizable with the monomer (A) in an aqueous medium in such a manner that the dispersed particles have an average particle diameter not more than 500 nm, and polymerizing the resulting emulsified product, or mini-emulsion polymerizing the same.

The present invention also provides aqueous resin compositions which contain said aqueous resin dispersion, and water-based paint compositions which contain said aqueous resin compositions.

According to the above process of this invention, an aqueous resin dispersion containing fatty acid-modified monomer units can be stably prepared, without using a large quantity of organic solvent or auxiliary surfactant and the like. Furthermore, aqueous resin compositions and water-based paint compositions which contain the aqueous resin dispersion show excellent storage stability and film-forming ability. They can be readily hardened at ambient temperature although they are single-component type and still in addition, hardened coating films formed therefrom have very favorable transparency, gloss and appearance (thick appearance), and show excellent performances in water resistance, durability, corrosion resistance, weatherability and the like. Thus, the present invention achieves conspicuous effects. In particular, the water-based paint compositions which contain the aqueous resin dispersion are suitable for protective coating on metallic surfaces, because they are well compatible with metallic surfaces such as of iron and can prevent occurrence of rust spots or the like.

Hereafter the present invention is explained in further details.

The process of the present invention is characterized in that it comprises finely dispersing a monomeric mixture (I) which contains (A) fatty acid-modified polymerizable unsaturated monomer(s) and (B) other polymerizable unsaturated monomer(s) which are copolymerizable with the monomer (A) in an aqueous medium such that the average particle diameter becomes no more than 500 nm, and polymerizing the resulting monomeric emulsified product, or mini-emulsion polymerizing the same.

Where the average particle diameter of the monomeric mixture in the emulsified product exceeds 500 nm, sedimentation of the monomeric emulsified product during storage or heterogeneity in hydrophilic-hydrophobic components' distribution become notable. Those phenomena are apt to cause opacity in coating film formed of the compositions prepared from the product and hence are undesirable.

In the present specification, the average particle diameter is measured of a sample diluted with deionized water, with SALD-3100™ (Shimazu Seisakujo, a laser diffraction particle size distribution measuring apparatus) at ambient temperature (around 20° C.). The average particle diameter is measured within 24 hours of the preparation of sample emulsified product of finely divided monomers or aqueous resin dispersion.

As the aqueous medium used at the polymerization time, water or water-organic solvent mixed solution prepared by mixing an organic solvent such as a water-soluble organic solvent with water which is the chief component, can be named.

Fatty Acid-Modified Polymerizable Unsaturated Monomer (A)

In the present invention, fatty acid-modified polymerizable unsaturated monomer (A) is used for facilitating fine granulation (or mini-emulsification) of the monomeric mixture at the time of its emulsification; for stabilizing the monomeric emulsified product after the fine granulation at its polymerization stage and inhibiting diffusion of other polymerizable unsaturated monomer (B) into the aqueous medium; for imparting thick appearance to the coating film formed by using the particles dispersed in the aqueous resin dispersion as prepared in the above-described manner; and for introducing oxidation-hardenable groups into the particles dispersed in the aqueous resin dispersion. The monomer includes polymerizable unsaturated monomers having polymerizable unsaturated groups at terminals of hydrocarbon chains derived from fatty acid. As the polymerizable unsaturated groups herein referred to, for example, vinyl group, (meth) acryloyl groups and the like can be named, meth(acryloyl) groups being particularly preferred.

As the fatty acid-modified polymerizable unsaturated monomer (A), for example, those which can be obtained by reacting fatty acid (a1) with epoxy-containing polymerizable unsaturated monomer (a2) or hydroxyl-containing polymerizable unsaturated monomer (a3) can be used.

As the fatty acid (a1), those having a structure that a carboxyl group is bound to one end of hydrocarbon chain, for example, drying oil fatty acid, semi-drying oil fatty acid and non-drying oil fatty acid can be named. While drying oil fatty acid and semi-drying oil fatty acid are not strictly distinguishable, normally drying oil fatty acid is an unsaturated fatty acid having iodine value no less than 130, and semi-drying oil fatty acid is an unsaturated fatty acid having iodine value of at least 100 but less than 130. On the other hand, non-drying oil fatty acid normally has iodine value less than 100.

As the drying oil fatty acid and semi-drying oil fatty acid, for example, fish oil fatty acid, dehydrated caster oil fatty acid, safflower oil fatty acid, linseed oil fatty acid, soybean oil fatty acid, sesame oil fatty acid, poppy oil fatty acid, perilla oil fatty acid, hempseed oil fatty acid, grape kernel oil fatty acid, corn oil fatty acid, tall oil fatty acid, sunflower oil fatty acid, cottonseed oil fatty acid, walnut oil fatty acid, rubber seed oil fatty acid, highly conjugated dehydrated caster oil fatty acid and the like can be named. As the non-drying oil fatty acid, for example, coconut oil fatty acid, hydrogenated coconut oil fatty acid, palm oil fatty acid and the like can be named. These can be used either singly or in combination of two or more. Furthermore, these fatty acids can be concurrently used with caproic acid, capric acid, lauric acid, myristic acid, palmitic acid, stearic acid and the like.

The epoxy-containing polymerizable unsaturated monomer (a2) which is reactable with above fatty acid (a1) for preparing the fatty acid-modified polymerizable unsaturated monomer (A) includes compounds having one epoxy group and one polymerizable unsaturated group per molecule. More specifically, for example, glycidyl meth(acrylate), β-methylglycidyl meth(acrylate), 3,4-epoxycyclohexylmethyl meth (acrylate), 3,4-epoxycyclohexylethyl meth(acrylate), 3,4-epoxycyclohexylpropyl meth(acrylate), allylglycidyl ether and the like can be named. These can be used either singly or in combination of two or more.

The fatty acid (a1) and epoxy-containing polymerizable unsaturated monomer (a2) can be reacted at such ratios that the equivalent ratio between carboxyl groups in the fatty acid (a1) and epoxy groups in the epoxy-containing monomer (a2) lies within a range of 0.75:1-1.25:1, preferably 0.8:1-1.2:1.

The reaction of above fatty acid (a1) with the epoxy-containing polymerizable unsaturated monomer (a2) is normally conducted in the presence of a polymerization inhibitor under such conditions as will not induce problems in the reaction such as gelation but allow smooth reaction of carboxyl groups in the fatty acid component with epoxy groups in the epoxy-containing polymerizable unsaturated monomer. It is normally suitable to conduct the reaction by heating at temperatures of about 100-about 180° C. for about 0.5-about 10 hours.

For the reaction an esterification catalyst such as tertiary amine, e.g., N,N-dimethylaminoethanol and the like, or quaternary ammonium salt, e.g., brominated tetraethylammonium, brominated tetrabutylammonium and the like can be used. Furthermore, an organic solvent which is inert to the reaction can be used.

As the polymerization inhibitor, those per se known radical polymerization inhibitors, for example, hydroxy compound such as hydroquinone, hydroquinone monomethyl ether, pyrocatechol, p-tert-butylcatechol and the like; nitro compound such as nitrobenzene, nitrobenzoic acid, o-, m- or p-dinitrobenzene, 2,4-dinitrotoluene, 2,4-dinitrophenol, trinitrobenzene, picric acid and the like; quinone compound such as p-benzoquinone, dichlorobenzoquinone, chloranil, anthraquinone, phenanthroquinone and the like; and nitroso compound such as nitrosobenzene, nitroso-β-naphthol and the like can be named. These can be used either singly or in combination of two or more.

The fatty acid-modified polymerizable monomer (A) can also be obtained through esterification reaction of said fatty acid (a1) with hydroxyl-containing polymerizable unsaturated monomer (a3). The hydroxyl-containing polymerizable unsaturated monomer (a3) includes those compounds having one hydroxyl group and one polymerizable unsaturated group per molecule, more specifically, for example, $C_2$-$C_8$ hydroxyalkyl (meth)acrylates such as 2-hydroxyethyl meth(acrylate), 2-hydroxypropyl (meth)acrylate, 3-hydroxypropyl (meth) acrylate, hydroxybutyl (meth)acrylate and the like; allyl alcohol; (meth)acrylates having hydroxyl group such as ε-caprolactone-modified products of above $C_2$-$C_8$ hydroxyalkyl (meth)acrylates; and (meth)acrylates having polyoxyethylene chain having a hydroxyl group at its molecular end. These may be used either singly or in combination of two or more.

The fatty acid (a1) and hydroxyl-containig polymerizable unsaturated monomer (a3) can be normally reacted at such ratios that the equivalent ratio of carboxyl groups in the fatty acid (a1) to hydroxyl groups in the hydroxyl-containing monomer (a3) lies within a range of 0.4:1-1.25:1, preferably 0.5:1-1.2:1.

The reaction of the fatty acid (a1) with the hydroxyl-containing polymerizable unsaturated monomer (a3) is normally conducted in the presence of a polymerization inhibitor under such conditions as will not induce problems such as gelation but allow smooth reaction of carboxyl groups in the fatty acid component with hydroxyl groups in the hydroxyl-containing polymerizable unsaturated monomer. It is normally suitable to conduct the reaction in the presence of an esterification catalyst, by heating at temperatures of about 100-about 180° C., for about 0.5-about 10 hours. As the esterification catalyst, for example, sulfuric acid, aluminium sulfate, potassium hydrogensulfate, alkyl-substituted benzene, hydrochloric acid, methyl sulfate, phosphoric acid and the like can be named. These catalysts can be used normally within a range of about 0.001-about 2.0 wt % to the combined amount of the fatty acid (a1) and hydroxyl-containing polymerizable unsaturated monomer (a3) that are reacted. Furthermore, an organic solvent which is inert to the reaction may be used.

As the polymerization inhibitor, those per se known radical polymerization inhibitors, for example, hydroxy compound such as hydroquinone, hydroquinone monomethyl ether, pyrocatechol, p-tert-butylcatechol and the like; nitro compound such as nitrobenzene, nitrobenzoic acid, o-, m- or p-dinitrobenzene, 2,4-dinitrotoluene, 2,4-dinitrophenol, trinitrobenzene, picric acid and the like; quinone compound such as p-benzoquinone, dichlorobenzoquinone, chloranil, anthraquinone, phenanthroquinone and the like; and nitroso compound such as nitrosobenzene, nitroso-β-naphthol and the like can be named. These can be used either singly or in combination of two or more.

Other Polymerizable Unsaturated Monomer (B)

The other polymerizable unsaturated monomer (B) which is used in the process of the present invention signifies those polymerizable unsaturated monomers which are copolymerizable with above fatty acid-modified polymerizable unsaturated monomer (A), and includes such compounds which contain at least one, preferably one only, polymerizable unsaturated group per molecule, e.g., vinyl group, (meth) acryloyl group and the like.

As specific examples of such other polymerizable unsaturated monomer (B), alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, octyl (meth)acrylate, 2-ethylhexyl (meth) acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth) acrylate, t-butylcyclohexyl (meth)acrylate, cyclododecyl (meth)acrylate, and the like; polymerizable unsaturated compounds having isobornyl group such as isobornyl (meth)acrylate; polymerizable unsaturated compounds having adamantyl group such as adamantyl (meth)acrylate; vinyl aromatic compounds such as styrene, α-methylstyrene, vinyltoluene and the like; polymerizable unsaturated compounds having alkoxysilyl group such as vinyl trimethoxysilane, vinyl triethoxysilane, vinyl tris (2-methoxyethoxy) silane, γ-(meth) acryloyloxypropyl-trimethoxysilane, γ-(meth)acryloyloxypropyl-triethoxysilane and the like; perfluoroalkyl (meth) acrylates such as perfluorobutylehtyl (meth)acrylate, perfluorooctylethyl(meth)acrylate and the like; polymerizable unsaturated compounds having photopolymerizable functional group like maleimide group; 1,2,2,6,6,-pentamethylpiperidyl (meth)acrylate, 2,2,6,6,-tetramethylpiperidinyl (meth)acrylate and the like; vinyl compounds such as N-vinylpyrrolidone, ethylene, butadiene, chloroprene, vinyl propionate, vinyl acetate and the like; compounds having carboxyl group such as (meth)acrylic acid, maleic acid, crotonic acid, β-carboxyethyl acrylate and the like; nitrogen-containing polymerizable unsaturated compounds such as (meth)acrylonitrile, (meth)acrylamide, dimethylaminopropyl (meth)acrylamide, dimethylaminoethyl (meth)acrylate, adducts of glycidyl (meth)acrylate and amines, and the like; $C_2$-$C_8$ hydroxyalkyl (meth)acrylates such as 2-hydroxyethyl meth(acrylate), 2-hydroxypropyl (meth)acrylate, 3-hydroxypropyl (meth)acrylate, hydroxybutyl (meth)acrylate and the like; allyl alcohol; (meth)acrylates having hydroxyl group such as ε-caprolactone-modified products of above $C_2$-$C_8$ hydroxyalkyl (meth)acrylates; polymerizable unsaturated compounds having hydroxyl group such as (meth)acrylates having polyoxyethylene chain having a hydroxyl group at its molecular end; (meth)acrylates having polyoxyethylene chain having an alkoxy group at its molecular end; polymerizable unsaturated compounds having sulfonic acid group such as 2-acrylamide-2-methylpropanesulfonic acid, allylsulfonic acid, sodium styrenesulfonate, sulfoethyl methacrylate and sodium salt or ammonium salt thereof; addition reaction products of hydroxybenzophenones with glycidyl (meth) acrylate, examples of the hydroxybenzophenone including 2-hydroxy-4-(3-methacryloyloxy-2-hydroxypropoxy)-benzophenone, 2-hydroxy-4-(3-acryloyloxy-2-hydroxypropoxy)benzophenone, 2,2'-dihydroxy-4-(3-methacryloyloxy-2-hydroxypropoxy)-benzophenone, 2,2'-dihydroxy-4-(3-acryloyloxy-2-hydroxypropoxy)-benzophenone and the like, or polymerizable unsaturated compounds having ultraviolet-absorbing functional group such as 2-(2'-hydroxy-5'-methacryloyloxyethylphenyl)-2H-benzotriazole or the like; ultraviolet-stable polymerizable unsaturated compounds such as 4-(meth)acryloyloxy-1,2,2,6,6,-pentamethylpiperidine, 4-(meth)-acryloyloxy-2,2,6,6,-tetramethylpiperidine, 4-cyano-4-(meth)-acryloylamino-2,2,6,6,-tetramethylpiperidine, 1-(meth)acryloyl-4-(meth)acryloylamino-2,2,6,6,-tetramethylpiperidine, 1-(meth)acryloyl-4-cyano-4-(meth)acryloylamino-2,2,6,6-tetramethylpiperidine, 4-crotonoyloxy-2,2,6,6,-tetramethylpiperidine, 4-crotonoylamino-2,2,6,6,-tetrametylpiperidine, 1-crotonoyl-4-crotonoyloxy-2,2,6,6,-tetramethylpiperidine and the like; polymerizable unsaturated compounds having carbonyl group such as acrolein, diacetonacrylamide, diacetonemethacrylamide, acetoacetoxyethyl methacrylate, formylstyrol, $C_4$-$C_7$ vinyl alkyl ketones (e.g., vinyl methyl ketone, vinyl ethyl ketone, vinyl butyl ketone); polyvinyl compounds having at least two polymerizable unsaturated groups per molecule such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1,-trishydroxymethylethane di(meth)acrylate, 1,1,1-trishydroxymethylethane tri(meth)acrylate, 1,1,1-trishydroxymethylpropane tri(meth)acrylate, triallylisocyanurate, diallylterephthalate, divinylbenzene and the like; can be named. These can be used either singly or in combination of two or more, depending on the performance desired for individual aqueous resin dispersions.

Use ratio of above monomer (A) and monomer (B) is subject to no particular limitation but may be suitably selected according to the performance desired of, or the utility intended for, individual aqueous resin dispersions. In general terms, based on the combined amount of the monomer (A) and monomer (B), monomer (A) may be within a range of 1-90 wt %, preferably 5-60 wt %, inter alia, 10-40 wt %; and monomer (B), within a range of 10-99 wt %, preferably 40-95 wt %, inter alia, 60-90 wt %. Where the use ratio of the monomer (A) is less than 1 wt %, oxidative hardening of the coating film formed with use of the resulting aqueous resin dispersion fails to progress satisfactorily, and also thick appearance of the coating film is apt to be impaired. On the other hand, where it exceeds 90 wt %, the hardened coating film formed with use of the resulting aqueous resin dispersion becomes brittle and the film may have insufficient weatherability.

It is preferred to select as the other polymerizable unsaturated monomer (B), so that the theoretical glass transition temperature of the (co)polymer of all of the used monomer(s) (B) should lie within a range of 0-100° C., preferably 10-80° C., inter alia, 40-70° C.

The glass transition temperature (absolute temperature) as referred to in this invention is calculated according to the following equation.

$$1/Tg = W_1/T_1 + W_2/T_2 + \ldots W_n/T_n$$

in which $W_1, W_2 \ldots W_n$ are wt % of each monomer [=(used amount of each monomer/total weight of the monomers)×100]; and $T_1, T_2 \ldots T_n$ are glass transition temperature (absolute temperature) of each homopolymer of respective monomer. Glass transition temperatures of the homopolymers of respective monomers are those values given in "Polymer Handbook" (Second Edition, ed. by J. Brandrup. E. H. Immergut). Where glass transition temperature relating to a certain monomer is not found in the Handbook, a homopolymer having a weight average molecular weight of around 50,000 of the particular monomer is synthesized, and the polymer's glass transition temperature is measured by means of differential scanning thermal analysis.

Where the theoretical glass transition temperature of (co) polymer of the total monomer (B) falls within the above-specified range, both satisfactory film-forming ability of the resulting aqueous resin dispersion and such physical properties of the coating film formed with use of the aqueous resin dispersion as weatherability, water resistance and the like can be obtained.

Furthermore, the other polymerizable unsaturated monomer (B) preferably contains carboxyl-containing polymerizable unsaturated monomer (b1) within a range of 0.1-5 wt %, preferably at least 0.5 wt % but less than 3 wt %, based on the total weight of the monomers (A) and (B).

As the carboxyl-containing polymerizable unsaturated monomer (b1), for example, (meth)acrylic acid, maleic acid, crotonic acid, β-carboxyethyl acrylate and the like can be named. Of these, particularly acrylic acid, methacrylic acid and crotonic acid are preferred. By the use of such carboxyl-containing polymerizable unsaturated monomer (b1) as at least a part of the other polymerizable unsaturated monomer (B), stability of resin particles dispersed in the aqueous medium of the resulting aqueous resin dispersion or mechanical stability can be secured. Furthermore, when the aqueous resin dispersion containing such a monomer (b1) is applied to enamel paint, color matching ability of the paint can be improved.

The other polymerizable unsaturated monomer (B) preferably comprises, furthermore, as at least a part thereof, 30-90 wt %, preferably 35-85 wt %, inter alia, 45-80 wt %, based on the combined weight of the monomer (A) and monomer (B), of polymerizable unsaturated monomer (b2). The monomer (b2) contains at least $C_4$ straight chain, branched chain or cyclic, saturated or unsaturated hydrocarbon group.

As such polymerizable unsaturated monomer (b2) containng at least $C_4$ hydrocarbon group, for example, alkyl or cycloalkyl (meth)acrylates such as n-butyl (meth)acrylate, i-butyl (meth)acrylate, tert-butyl (meth)acrylate, n-hexyl (meth)acrylate, octyl (meth)acrylate, 2-ethylhexyl (meth) acrylate, nonyl (meth)acrylate, tridecyl (meth)acrylate, lauryl (meth)acrylate, stearyl (meth)acrylate, "isostearyl acrylate" (Osaka Organochemical Co.), cyclohexyl (meth)acrylate, methylcyclohexyl (meth)acrylate, t-butylcyclohexyl (meth) acrylate, cyclododecyl (meth)acrylate and the like; polymerizable unsaturated compounds having isobornyl group such as isobornyl (meth)acrylate; polymerizable unsaturated compounds having adamantyl group such as adamantyl (meth) acrylate; and vinyl aromatic compounds such as styrene, α-methylstyrene, vinyltoluene and the like can be named. Use of such polylmerizable unsaturated monomer (b2) having at least $C_4$ hydrocarbon group contributes to improve water resistance of coating film formed of the particles dispersed in the resulting aqueous resin dispersion.

It is also desirable that the other polymerizable unsaturated monomer (B) comprises, as at least a part thereof, polymerizable unsaturated monomer (b3) having at least $C_6$ straight chain or branched chain hydrocarbon group, in an amount of 1-30 wt %, preferably 5-20 wt %, inter alia, 6-18 wt %, based on the combined weight of the monomers (A) and (B).

As the polymerizable unsaturated monomer (b3) having at least $C_6$ straight or branched chain hydrocarbon group, for example, n-hexyl (meth)acrylate, octyl (meth)acrylate, 2-ethylhexyl (meth)acrylate, nonyl (meth)acrylate, tridecyl (meth) acrylate, lauryl (meth)acrylate, stearyl (meth)acrylate, "isostearyl acrylate" (Osaka Organochemical Co.) and the like can be named. These can be used either singly or in combination of two or more.

Use of such polymerizable unsaturated monomer (b3) containing at least $C_6$ straight or branched chain hydrocarbon group as at least a part of the other polymerizable unsaturated monomer (B) allows the monomeric emulsified product after the concurrent fine granulation of the other polymerizable unsaturated monomer (B) with the fatty acid-modified polymerizable unsaturated monomer (A) to maintain polymerization stability and furthermore enables production of aqueous resin dispersions which can form coating film of excellent water resistance.

In the occasion of preparing an aqueous resin dispersion according to the process of the invention, it is desirable that the other polymerizable unsaturated monomer (B) comprises those carboxyl-containing polymerizable unsaturated monomer (b1), polymerizable unsaturated monomer (b2) which contains hydrocarbon group having at least 4 carbon atoms and other polymerizable unsaturated monomer (b7) other than above fatty acid-modified polymerizable unsaturated monomer (A), monomer (b1) and monomer (b2): that the monomeric mixture (I) to be emulsion polymerized contains, based on the combined weight of the monomers (A) and (B), 5-50 wt %, preferably 10-40 wt %, inter alia, 10-35 wt %, of monomer (A); 0.1-5 wt %, preferably 0.5-4.5 wt %, inter alia, 0.5-3 wt %, of monomer (b1); 45-80 wt %, preferably 50-75 wt %, inter alia, 55-70 wt %, of monomer (b2), and 0-49.9 wt %, preferably 0-39.5 wt %, inter alia, 0-34.5 wt % of the other polymerizable unsaturated monomer (b7); and the polymerizable unsaturated monomer (b2) containing hydrocarbon group having at least 4 carbon atoms comprises, based on the combined weight of the monomers (A) and (B), 1-30 wt %, preferably 5-20 wt %, inter alia, 6-18 wt % of the polymerizable unsaturated monomer (b3) containing straight or branched chain hydrocarbon group having at least 6 carbon atoms.

In the above composition, where the use ratio of monomer (A) is less than 5 wt %, thick appearance of coating film formed with use of resulting aqueous resin dispersion becomes insufficient. On the contrary, where it exceeds 50 wt %, coating film formed from the composition may exhibit insufficient weatherability. Where the use ratio of monomer (b1) is less than 0.1 wt %, particles in the resulting aqueous resin dispersion may show insufficient stability. On the contrary, where it exceeds 5 wt %, coating film formed from the resulting dispersion may have reduced water resistance. Furthermore, where the use ratio of monomer (b2) is less than 45 wt %, coating film formed from the resulting dispersion may have reduced water resistance. On the other hand, where it exceeds 80 wt %, storage stability of resulting aqueous resin dispersion may be impaired.

Aqueous resin dispersions can be stably prepared through copolymerization of fatty acid-modified polymerizable unsaturated monomer (A) and the other polymerizable unsaturated monomer (B) at the above-specified ratios, and the aqueous resin dispersions can form coating films having transparency and thick appearance and exhibiting excellent performance such as water resistance and the like.

It is also desirable that the other polymerizable unsaturated monomer (B) contains, as at least a part thereof, cycloalkyl-containing polymerizable unsaturated monomer (b4).

As the cycloalkyl-containing polymerizable unsaturated monomer (b4), those compounds having one cycloalkyl group containing at least 6 carbon atoms and one polymerizable unsaturated bond per molecule are suitable. Examples of such compounds include cyclohexyl (meth)acrylate, methylcyclohexyl (meth)acrylate, t-butylcyclohexyl (meth)acrylate, cyclododecyl (meth)acrylate and the like, which can be used either singly or in combination of two or more. Of these, cyclohexyl (meth)acrylate is preferred.

Use of cycloalkyl-containing polymerizable unsaturated monomer (b4) as at least a part of the other polymerizable unsaturated monomer (B) can improve weatherability of coating film formed from the resulting aqueous resin dispersion, and also can improve its water resistance, soil resistance and the like. Where improvement in weatherability is intended, adequate (b4) content is 1-70 wt %, preferably 10-60 wt %, inter alia, 25-45 wt %, based on the combined weight of monomers (A) and (B).

It is also desirable that the other polymerizable unsaturated monomer (B) contains, as at least a part thereof, aromatic vinyl monomer (b5). As the aromatic vinyl monomer (b5), for example, vinyl aromatic compounds such as styrene, α-methylstyrene, vinyltoluene and the like can be named, which can be used either singly or in combination of two or more. Use of such aromatic vinyl monomer (b5) can increase copolymerizability of total monomers and also can improve physical properties of formed coating film, such as water resistance.

In general terms, it is adequate to use such aromatic vinyl monomer (b5) within a range of 1-50 wt %, preferably 5-45 wt %, inter alia, 12-35 wt %, based on the combined weight of monomers (A) and (B).

In the occasion of preparing an aqueous resin dispersion according to the process of the invention, it is desirable that the other polymerizable unsaturated monomer (B) comprises those cycloalkyl-containing polymerizable unsaturated monomer (b4), aromatic vinyl monomer (b5), and other polymerizable unsaturated monomer (b8) other than above monomer (A), monomer (b4) and monomer (b5): and that the monomeric mixture (I) to be emulsion polymerized contains, based on the combined weight of the monomers (A) and (B), 5-50 wt %, preferably 10-40 wt %, inter alia, 10-35 wt %, of monomer (A); 1-70 wt %, preferably 10-60 wt %, inter alia, 25-45 wt %, of monomer (b4); 1-50 wt %, preferably 5-45 wt %, inter alia, 12-35 wt %, of monomer (b5), and 0-93 wt %, preferably 0-75 wt %, inter alia, 0-47 wt % of the other polymerizable unsaturated monomer (b8).

In the above composition, where the use ratio of monomer (A) is less than 5 wt %, thick appearance of coating film formed with use of resulting aqueous resin dispersion becomes insufficient. On the contrary, where it exceeds 50 wt %, coating film formed from the composition may exhibit insufficient weatherability. Where the use ratio of monomer (b4) is less than 1 wt %, formed coating film has insufficient weatherability. On the contrary, when it exceeds 70 wt %, polymerization stability is occasionally impaired. Furthermore, when use ratio of monomer (b5) is less than 1 wt %, water resistance of coating film formed therefrom may be reduced. On the other hand, when it exceeds 50 wt %, weatherability of formed coating film may become insufficient.

Through copolymerization of fatty acid-modified polymerizable unsaturated monomer (A) and the other polymerizable unsaturated monomer (B) at the above-specified ratios, aqueous resin dispersions which form coating films having transparency, thick appearance and particularly favorable water resistance and weatherability can be prepared.

Again, in the occasion of preparing an aqueous resin dispersion of the present invention, it is desirable that the other polymerizable unsaturated monomer (B) comprises, as at least a part thereof, carbonyl-containing polymerizable unsaturated monomer (b6).

The carbonyl-containing polymerizable unsaturated monomer (b6) includes compounds having one carbonyl group and one polymerizable unsaturated bond per molecule. More specifically, for example, acrolein, diacetone acrylamide, diacetone methacrylamide, acetoacetoxyethyl methacrylate, formyl styrol, $C_4$-$C_7$ vinyl alkyl ketone (e.g., vinyl methyl ketone, vinyl ethyl ketone, vinyl butyl ketone) and the like can be named. These can be used either singly or in combination of two or more. In particular, diacetone (meth)acrylamide are preferred.

When such carbonyl-containing polymerizable unsaturated monomer (b6) is used as at least a part of the other polymerizable unsaturated monomer (B), and when a later-specified hydrazine derivative is blended with the resulting aqueous resin dispersion, auxiliary crosslinkage of the monomer (b6)-derived carbonyl groups and the hydrazine derivative can be promoted in addition to the oxidative hardening caused by the fatty acid (a1) component, and drying property of the coating film formed from the dispersion can be further improved. Using this dispersion, paint compositions capable of forming coating film showing favorable physical properties such as weatherability, water resistance and the like can be prepared.

In general terms, such carbonyl-containing monomer (b6) is suitably used within a range of 0.5-35 wt %, preferably 2-20 wt %, based on the combined weight of the monomers (A) and (B).

Where the other polymerizable unsaturated monomer (B) comprises such carbonyl-containing polymerizable unsaturated monomer (b6), kind of the fatty acid (a1) is not particularly limited, which may be semi-drying oil fatty acid and/or non-drying oil fatty acid. Semi-drying oil fatty acid and/or non-drying oil fatty acid are generally those of low oxidative hardenability, and those earlier exemplified can be used.

Use ratios of semi-drying oil fatty acid and/or non-drying oil fatty acid and carbonyl-containing polymerizable unsaturated monomer (b6) can be generally within the following ranges based on the combined weight of the monomers (A) and (B): semi-drying oil fatty acid and/or non-drying oil fatty acid, 5-50 wt %, preferably 10-40 wt %; and carbonyl-containing polymerizable unsaturated monomer (b6), 0.5-35 wt %, preferably 2-20 wt %. Where semi-drying oil fatty acid and/or non-drying oil fatty acid component is less than 5 wt %, thick appearance of the coating film formed from the resulting aqueous resin dispersion may be impaired. On the contrary, when it exceeds 50 wt %, water resistance of the formed coating film may become insufficient. Again, where carbonyl-containing polymerizable unsaturated monomer (b6) is less than 0.5 wt %, formed coating film has insufficient water resistance and weatherability. On the other hand, when it exceeds 35 wt %, formed coating film may become brittle.

Use of carbonyl-containing polymerizable unsaturated monomer (b6) as at least a part of the monomer (B) allows crosslinkage between the carbonyl groups and later-described hydrazine derivative to progress where such a hydrazine derivative is concurrently used. Hence, even when semi-drying oil fatty acid and/or non-drying oil fatty acid are used as the fatty acid (a1) component, aqueous resin dispersion capable of forming coating film of thick appearance which exhibits favorable weatherability, water resistance and the like and showing good compatibility with iron substrate material can be prepared.

The other polymerizable unsaturated monomer (B) furthermore can comprise hydroxyl-containing (meth)acrylate, for securing stability of finely granulated monomeric emulsified product at the polymerization stage or stability of particles in aqueous resin dispersions during storage. As the hydroxyl-containing (meth)acrylate, those earlier exemplified can be used, and its use ratio is within a range of 1-50 wt %, preferably 1-30 wt %, inter alia, 1-10 wt %, based on the combined amount of the monomers A and B.

According to the invention, the monomeric mixture (I) comprises, as the essential components, heretofore described fatty acid-modified polymerizable unsaturated monomer (A) and other polymerizable unsaturated monomer (B) which is copolymerizable with the monomer (A). The monomeric mixture (I) may further contain a compound or compounds which do not substantially contain polymerizable unsaturated group.

Use of such monomeric mixture (I) comprising compound(s) which do not substantially contain polymerizable unsaturated group allows preparation of particles enclosing said compound(s) as dispersed in the aqueous resin dispersions.

As the compounds which do not substantially contain polymerizable unsaturated group, for example, paint additives such as ultraviolet absorber, ultraviolet stabilizer, metallic dryer and the like; resins such as acrylic resin, polyester resin, polyurethane resin, alkyd resin and the like; and coloring agents such as pigment, dye and the like can be named. These can be used either singly or in combination of two or more. In particular, at least one selected from the ultraviolet absorber, ultraviolet stabilizer and metallic dryer is preferred.

As the ultraviolet absorber, for example, salicylic acid derivatives such as phenyl salicylate, p-octylphenyl salicylate, 4-t-butylphenyl salicylate and the like; benzophenone compounds such as 2,4-dihyroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2-2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoylresorcinol, 4,6-dibenzoylresorcinol, hydroxydodecylbenzophenone, 2,2'-dihydroxy-4(3-methacryloxy-2-hydroxypropoxy)-benzophenone and the like; benzotriazole compounds such as 2-(2'-hydroxy-5'-methylphenyl)-benzotriazole and the like; other compounds such as oxalic acid anilide, cyanoacrylate and the like; and acrylic copolymers containing above-exemplified ultraviolet absorbing monomer as a copolymerized component can be named.

As the ultraviolet stabilizer, for example, 2-(3-t-butyl-5-methyl-2-hydroxyphenyl)-5-chlorobenzotriazole, 2-(3,5-di-t-butyl-2-hydroxyphenyl)-5-chlorobenzotriazole, poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}], dimethyl succinate 1-(2-hydroxyethyl)-4-hydroxy-2,2,6,6-tetramethylpiperidine polycondensate, 2,4-di-t-butylphenyl-3,5-di-t-butyl-4-hydroxybenzoate, bis-(2,2',6,6'-tetramethyl-4-piperidinyl)cebacate, 4-benzoyloxy-2,2',6,6'-tetramethylpiperidine, acrylic copolymers containing above-exemplified ultraviolet-stable monomer as a copolymerized component can be named.

Above ultraviolet absorber and/or ultraviolet stabilizer may be used singly or as suitably selected combinations. Generally suitable use ratios of the ultraviolet absorber and/or ultraviolet stabilizer are: based on the combined weight of the monomers (A) and (B), ultraviolet absorber, within a range of 0.1-5.0 wt %, in particular, 0.2-0.7 wt %; and the ultraviolet stabilizer, 0.1-5.0 wt %, in particular, 0.2-3.0 wt %.

In the present invention, where the monomeric mixture (I) contains such ultraviolet absorber and/or ultraviolet stabilizer, at least a part of the particles dispersed in the resulting aqueous resin dispersion enclose the ultraviolet absorber and/or ultraviolet stabilizer and in consequence the absorber and/or stabilizer are uniformly dispersed in coating film formed from the aqueous resin dispersion. Furthermore, they are not eluted out of the formed film by rain water or the like and exhibit their effect stably over a prolonged period.

As the metallic dryer, for example, salts of at least one metal selected from the group consisting of aluminum, calcium, cerium, cabalt, iron, lithium, magnesium, manganese, zinc and zirconium, with acid can be named. As the acid, for example, capric acid, caprylic acid, isodecanoic acid, linolenic acid, naphthenic acid, neodecanoic acid, actenic acid, oleic acid, palmitic acid, resin acid, ricinoleic acid, soybean oil fatty acid, stearic acid, tall oil fatty cid and the like can be named.

In the present invention, where such a metallic dryer is contained in the monomeric mixture (I) prior to the polymerization, oxidative hardenability of coating film formed from the resulting aqueous resin dispersion can be improved. This is presumably because the metallic dryer is enclosed in at least a part of the particles dispersed in the aqueous resin dispersion, and when the dryer-enclosing particles are formed into film, the metallic dryer can effectively act on oxidative hardening polymerizable unsaturated groups, within the enclosing particles. Generally suitable use amount of the metallic dryer is, based on combined weight of the monomers (A) and (B), within a range of 0.5-10 wt %, in particular, 1-7 wt %.

In the occasion of fine granulation of the monomeric mixture (I) in an aqueous medium, an emulsifier may be concurrently used where necessary. As the emulsifier, anionic emulsifier and nonionic emulsifier are suitable. As the anionic emulsifier, for example, sodium salt or ammonium salt of alkylsulfonic acid, alkylbenzenesulfonic acid, alkylphosphoric acid and the like can be named. Also as the nonionic emulsifier, for example, polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate and the like can be named.

It is also permissible to use polyoxyalkylene-containing anionic emulsifier which has an anionic group and a polyoxyalkylene group such as polyoxyethylene group or polyoxypropylene group per molecule or reactive anionic emulsifier having the anionic group and polymerizable unsaturated group per molecule.

Such an emulsifier can be used within a range of 0.1-15 wt %, preferably 0.5-12 wt %, based on the combined amount of total monomers.

The monomeric mixture (I) may also contain a chain transfer agent, for the purpose of adjusting molecular weight of the resulting aqueous resin dispersion. Useful chain transfer agent includes compounds having mercapto group. As specific examples, laurylmercaptan, t-dodecylmercaptan, octylmercaptan, 2-ethylhexyl thioglycolate, 2-methyl-5-tert-butylthiophenol, mercaptoethanol, thioglycerol, mercaptoacetic acid (thioglycolic acid), mercaptopropionate, n-octyl-3-mercaptopropionate and the like can be named. Generally suitable use amount of the chain transfer agent is, based on the combined amount of total monomers, within the range of 0.05-10 wt %, in particular, 0.1-5 wt %.

Where necessary, the monomeric mixture (I) may further be blended with organic solvent such as long chain saturated hydrocarbon solvent like hexadecane, long chain alcoholic solvent like hexadecanol and the like.

According to the present invention, so far described monomeric mixture (I) can form a monomeric emulsified product when it is finely dispersed in an aqueous medium.

Concentration of the monomeric mixture (I) in an aqueous medium generally suitably lies within a range of 10-70 wt %, preferably 20-60 wt %, from the standpoint of fine granulation-forming ability of the monomeric emulsified product formed, stability at the polymerization stage and practical utility when it is applied to water-based paint.

Fine dispersing of the monomeric mixture (I) in an aqueous medium can be normally conducted with a dispersing machine having high-energy shearing ability. As useful dispersing machines in that occasion, for example, high-pressure emulsifier, ultrasonic emulsifier, high-pressure colloid mill, high-pressure homogenizer and the like can be named. These dispersing machines are normally operable under high pressure levels of 10-1000 MPa, preferably around 50-300 MPa. The monomeric mixture may be preliminarily emulsified with a dispersing device or the like, in advance of the machine dispersing.

Suitable average particle diameter of the particles dispersed in the monomeric emulsified product, which is obtained upon finely dispersing the monomeric mixture (I) with above-described means, is not more than 500 nm, preferably within the range of 80-400 nm, inter alia, 100-300 nm, in consideration of transparency and water resistance of formed coating film.

Polymerization of thus obtained monomeric emulsified product can be conducted, for example, through the steps of feeding the entire amount of the monomeric emulsified product after the fine dispersion into a reactor equipped with a stirrer, adding a polymerization initiator and heating the system under stirring, following known mini-emulsion polymerization method.

As the polymerization initiator, either oil-soluble or water-soluble type can be used. As examples of oil-soluble polymerization initiator, organic peroxides such as benzoyl peroxide, octanoyl peroxide, lauroyl peroxide, stearoyl peroxide and the like; and azo compounds such as azobisisobutyronitrile, azobis-(2,4-dimethylvaleronitrile) and the like can be named. As examples of water-soluble initiator, organic peroxides such as cumene hydroperoxide, tert-butyl peroxide, tert-butyl peroxylaurate, tert-butyl peroxyisopropylcarbonate, tert-butyl peroxyacetate, diisopropylbenzene hydroperoxide and the like; azo compounds such as azobis(2-methylpropionitrile), azobis(2-methylbutyronitrile), 4,4'-azobis(4-cyanobutanoic acid), dimethylazobis-(2-methylpropionate), azobis[2-methyl-N-(2-hydroxyethyl)-propionamide], azobis{2-methyl-N-[2-(1-hydroxybutyl)]-propionamide} and the like; and persulfates such as potassium persulfate, ammonium persulfate, sodium persulfate and the like can be named. These may be used either singly or in combination of two or more. Where necessary, a reducing agent such as sugar, sodiumformaldehyde sulfoxylate, iron complex or the like may be used concurrently with such polymerization initiator to form a redox polymerization system.

Preferred use amount of the polymerization initiator ranges 0.1-5 wt %, in particular, 0.2-3 wt %, based on the combined weight of the monomers (A) and (B). Means to add the polymerization initiatior is subject to no particular limitation and can be suitably selected depending on its kind or amount. For example, it may be contained in the monomeric mixture (I) or in the aqueous medium in advance, or added at one time or dropwise during polymerization.

According to the invention, where the aqueous resin dispersion contains acidic groups, it is desirable to neutralize them with a neutralizing agent, for improving mechanical stability of particles dispersed in the aqueous resin dispersion. The neutralizing agent is subject to no limitation so long as it can neutralize acidic groups. For example, sodilum hydroxide, potassium hydroxide, trimethylamine, dimethylaminoethanol, 2-methyl-2-amino-1-propanol, triethylamine, aqueous ammonia and the like can be named. These neutralizing agents are desirably used in such respective amount as will render pH of the aqueous resin dispersion after the neutralization about 6.5-9.0.

According to the so far described process of the present invention, an aqueous resin dispersion in which the dispersed resin has an average particle diameter not greater than 500 nm, in particular, within the range of 100-300 nm can be prepared. The average particle diameter of the dispersed resin in each aqueous resin dispersion depends on the average particle diameter of dispersed particles in the monomeric emulsified product prior to polymerization. Where the average diameter of the particles dispersed in the monomeric emulsified product prior to the polymerization is caused to lie within the above-specified range, variation ratio of average particle diameter of dispersed resin in the aqueous resin dispersion to that of the dispersed particles in the monomeric emulsified product can be generally kept within a range of 50-150%, in particular, at least 60% but less than 100%, inter alia, 70-99%. Said variation ratio can be caluculated according to the following equation:

$$\text{variation ratio in average particle diameter}(\%) = \frac{\text{average particle diameter}(nm) \text{ of resin dispersed in aqueous resin dispersion}}{\text{average particle diameter}(nm) \text{ of particles dispersed in monomeric emulsified product}} \times 100.$$

Where the variation ratio of average particle diameter lies within the above-specified range, the emulsion polymerization can be stably conducted, and the average particle diameter of the resin in the eventually obtained aqueous resin dispersion can be made to fall within the above-specified range (not greater than 500 nm, in particular, 80-400 nm, inter alia, 100-300 nm) to enable formation of transparent hardened coating film.

It is generally desirable for aqueous resin dispersions which are prepared according to the process of the invention to have weight-average molecular weight ranging 10,000-300,000, in particular, 30,000-200,000. Weight-average molecular weight as referred to in the present specification is the value obtained by converting weight-average molecular weight of a sample dispersion using tetrahydrofuran as the solvent, as measured by means of gel permeation chromatography, based on weight-average molecular weight of polystyrene. As the column used in the gel permeation chromatography, "TSKgel G-4000 H×L", "TSKgel G-3000 H×L", "TSKgel G-2500 H×L" and "TSKgel G-2000 H×L" (tradenames, products by Tosoh Corporation) can be named.

It is generally convenient for the aqueous resin dispersions to have an oil length within a range of 0.5-45%, preferably 3-30%, inter alia, 10-25%. Where the oil length is less than 0.5%, coating film formed therefrom exhibits insufficient oxidative hardenability. On the other hand, where it exceeds 45%, the coating film tends to become hard and brittle as its drying time passes and may come to have inferior performance in weatherability, alkali resistance and the like. In the present specification, oil length refers to weight percentile value of fatty acid contained in solid component of an aqueous resin dispersion.

Aqueous Resin Compositions

Aqueous resin compositions provided by the invention comprise those aqueous resin dispersions obtained as above-described.

The aqueous resin compositions may additionally contain hydrazine derivatives.

As specific examples of the hydrazine derivatives, $C_2$-$C_{18}$ saturated dicarboxylic acid dihydrazides such as oxalic acid dihydrazide, malonic acid dihydrazide, glutaric acid dihyrazide, succinic acid dihyrazide, adipic acid dihydrazide, sebacic acid dihydrazide and the like; monoolefinic unsaturated dicarboxylic acid dihydrazides such as maleic acid dihydrazide, fumaric acid dihydrazide, itaconic acid dihydrazide and the like; terephtalic acid dihydrazide or isophthalic acid dihydrazide; pyromellitic acid dihydrazide, trihydrazide or tetrahydrazide; nitrilotrihydrazide, citric acid trihydrazide, 1,2,4-benzene trihydrazide, ethylenediaminetetraacetic acid tetrahydrazide, 1,4,5,8-naphthoic acid tetrahydrazide; polyhydrazides obtained through reaction of low molecular weight polymers having carboxylic acid lower alkyl ester groups with hydrazine or hydrazine hydrate; hydrazide-containing compounds such as carbonic acid dihydrazide and the like; bis-semicarbazide; polyfunctional semicarbazides which are obtained by reacting diisocyanate such as hexamethylene diisocyanate, isophorone diisocyanate, or polyisocyanate compounds derived therefrom with excessive N,N-substituted hydrazines such as N,N-dimethylhydrazine or above-exemplified hydrazides, aqueous polyfunctional semicarbazides which are obtained by reacting isocyanate groups in reaction products of above polyisocyanate compounds with polyether and active hydrogen compounds containing hydrophilic groups, such as polyols or polyethylene glycol monoalkyl ethers, with excessive amount of above-exemplified dihydrazide; compounds having semicarbazide groups such as mixtures of the polyfunctional semicarbazide and aqueous polyfunctional semicarbazide; and compounds having hydrazone groups such as bis-acetyl dihydrazone and the like can be named.

Where the aqueous resin compositions contain such hydrazine derivatives, coating film formed therefrom absorbs harmful substances in the air, for example, formaldehyde, and are useful for removal of these harmful substances. Furthermore, where the aqueous resin dispersion has carbonyl groups, such a hydrazine derivative can act as a crosslinking agent for auxiliary crosslinkage.

Desirable amount of the hydrazine derivative to be blended lies, based on the solid resin content of the aqueous resin dispersion, generally within a range of 0.01-10 wt %, in particular, 0.1-8 wt %.

The aqueous resin compositions may further contain, where necessary, such additives as wetting agent, defoaming agent, plasticizer, film-forming assistant, organic solvent, thickener, antiseptic, antifungus agent, pH regulating agent, hardening catalyst, surface treating agent and the like, in suitable selective combination. Those already explained metallic dryer, ultraviolet absorber and ultraviolet stabilizer may also be contained in the aqueous resin compositions.

The aqueous resin compositions provided by the present invention are hardenable even at ambient temperatures, and resulting hardened films are transparent. More specifically, transmission haze value of the hardened films, for example, can be made 5 or less. This transmission haze value is determined as follows. On a transparent sheet whose transmission haze value has been measured with "COH-300A" (a color-difference. turbidity measuring machine, Nihon Denshoku Kogyo Co.), a test sample is applied to a dry film thickness of 20 μm and aged for a week at 20° C. to provide a test specimen. Transmission haze value of this test specimen is measured with COH-300A, and the transmission haze value of the transparent sheet is subtracted from the measured value.

Thus the aqueous resin compositions can be put to various uses such as paints for architecture, outer panels of automobiles, car parts and the like, coating materials like printing ink, paint additives, joining agent for non-woven fabric, adhesives, fillers, molding materials, resist and the like.

Water-Based Paint Compositions

This invention also provides water-based paint compositions which contain above aqueous resin compositions.

The water based paint compositions can be used as clear paint or enamel paint.

Where they are used as enamel paint, coloring pigment, effect pigment, extender, rust preventive pigment or the like which are known in the art of paint can be blended as pigment component.

For example, it is generally desirable for the water-based paint compositions containing titanium white, to contain titanium white at a pigment volumetric concentration (PVC) within a range of 5-25%, preferably 7-22%, for retaining thick appearance of formed coating film and having glossy finish. As the titanium white, rutile type is preferred from the standpoint of weatherability. Here the "pigment volumetric concentration" refers to the volumetric ratio of blended pigment component to the combined solid content of total resin component and total pigment in the concerned paint. In the present specification, specific gravity value of each pigment which provides the basis for calculating the pigment's volume conforms to "Toryo Genryo Binran" (manual of paint materials), 6th ed. (Nihon Paint Industries Corporation Association) and specific gravity of solid resin content is assumed to be approximate to 1.

The water-based paint compositions may contain, other than the above-described components, modifying resins such as water-soluble or emulsifiable acrylic resin, alkyd resin, silicone resin, fluorine-containing resin, epoxy resin, urethane resin, polyester resin and the like; pigment-dispersing agent, surfactant, dispersant, defoaming agent, thickener, film-forming assistant, antiseptic, antifungus agent, antifreezing agent, pH regulator, flash rust inhibitor, aldehyde capturing agent, laminar clay mineral, powdery or fine particulate active carbon, titanium oxide as an optical catalyst, antifouling agent such as polyalkylene glycol-modified alkyl silicate and the like. These additives can be contained either singly or in combination of two or more.

The water-based paint compositions can be applied onto new substrate surfaces or old coating film-applied surfaces. Materials constituting the substrate are subject to no particular limitation, which may be, for example, inorganic substrate such as concrete, mortal, slate plate, PC plate, ALC plate, cement calcium silicate plate, concrete blocks, wood, stone and the like; organic substrate such as plastics; and metals such as iron, aluminum and the like. As old coating films, those of acrylic resin, acrylic-urethane resin, polyurethane resin, fluorine-containing resin, silicone-acrylic resin, vinyl acetate resin, epoxy resin, alkyd resin and the like, which have been applied onto those substrates, can be named. These old coated surfaces may be applied with water-based or solvent-based undercoat, and where necessary, a water-based paint composition of the present invention can be applied onto the undercoat-applied surface. It is also possible to apply a water-based paint composition of the invention as an undercoat and thereafter apply a known water-based top coat thereonto.

Because the fatty acid component of the aqueous resin dispersion in the water-based paint compositions of the present invention is highly compatible with iron, the compositions are suitable to provide protective film on iron substrate or coated iron substrate surface. Single or plural applications of the composition are sufficient to maintain appearance for a long term.

In applying a water-based paint composition of the present invention onto metallic surface of iron substrate or the like, the composition desirably contains 1-10%, in particular, 2-8% of phosphoric acid-derived pigment, in terms of PVC.

It is desirable that the phosphoric acid-derived pigments are those which are readily dispersible in the presence of high molecular surfactant, from the viewpoint of corrosion resistance and gloss. As specific examples of such phosphoric acid-derived pigment, zinc phosphate, zinc phosphosilicate, zinc aluminum phosphate, zinc calcium phosphate, calcium phosphate, aluminum pyrophosphate, calcium pyrophosphate, aluminum dihydrogentripolyphosphate, aluminium metaphosphate, calcium metaphosphate, zinc phosphomolybdate, aluminum phosphomolybdate and the like can be named.

The water-based paint compositions of the invention may also contain at least one basic compound selected from the group consisting of nitrous acid salt, phytic acid salt, tannic acid salt and polyamine compounds. As nitrous acid salt, for example, sodium nitrite, calcium nitrite, strontium nitrite, barium nitrite, ammonium nitrite and the like can be named. As phytic acid salt, for example, sodium phytate, potassium phytate and the like can be named. As tannic acid salt, for example, sodium tannate, potassium tannate and the like can be named, and as polyamine compound, for example, N-(2-hydroxyethyl)-ethylenediamine triacetate (HEDTA), ethylenediamine tetraacetate (EDTA), diethylenetriamine pentaacetate (DTPA), propylenediamine tetraacetate (PDTA), iminodiacetic acid, nitrilotriacetic acid (NTA), diethylenetriaminepentamethylenephosphoric acid (DTPMP), and their alkali metal salts, and intercalational compound formed by intercalating monoalkylamine or polyamine, quaternary ammonium ion and the like into laminar phosphate such as aluminum dihydrogentripolyphosphate, and the like can be named. These can be used either singly or in combination of two or more.

Addition of these basic compounds enables to prevent occurrence of rust spots in coating film formed by directly applying a water-based paint composition onto a metallic surface, as rust on the metallic surface bleeds onto the coated surface. Suitable amount of the basic compound to be added lies within a range of 0.02-2 wt %, in particular, 0.05-1 wt %, based on the weight of the concerned water-based paint composition.

Water-based paint compositions of the present invention can be applied by such means as air spray, airless spray, electrostatic application, brushing, roller coating, texture gun, universal gun and the like. Drying can be effected by any of heat drying, forced drying and ambient temperature drying. In the present specification, drying condition at lower than 40° C. is referred to as ambient temperature drying, drying condition at no lower than 40° C. but lower than 80° C. is referred to as forced drying, and drying condition at 80° C. or above, as heat drying. Application rate of a water-based paint composition of the present invention can be, for example, within a range of 50-300 g/m$^2$.

EXAMPLES

Hereafter the present invention is more specifically explained referring to working examples, in which parts and % are wt parts and wt %.

Preparation of Fatty Acid-Modified Monomers

Production Example 1

The following components were placed in a reaction vessel and reacted at reaction temperature of 140° C. under stirring, to provide a fatty acid-modified monomer (a-1). The reaction of epoxy groups with carboxyl groups was monitored by measuring the amount of residual carboxyl groups. About 5 hours were required for completing the reaction.

| Safflower oil fatty acid | 280 parts |
|---|---|
| Glycidyl methacrylate | 142 parts. |

Production Example 2

Production Example 1 was repeated except that the reacted components were changed to the following, to provide a fatty acid-modified monomer (a-2).

| Linseed oil fatty acid | 280 parts |
|---|---|
| Glycidyl methacrylate | 142 parts. |

Production Example 3

Production Example 1 was repeated except that the reacted components were changed to the following, to provide a fatty acid-modified monomer (a-3).

| Coconut oil fatty acid | 210 parts |
|---|---|
| Glycidyl methacrylate | 142 parts. |

Production Example 4

The following components were put in a reaction vessel and heated to 120° C. under stirring.

| Safflower oil fatty acid | 2240 parts |
|---|---|
| Hydroquinone | 1.8 parts |
| Methylsulfuric acid | 2.6 parts |
| Toluene | 144 parts. |

Then a mixture of the following components was dropped into the reaction vessel over a period of 2 hours.

| Hydroxyethyl methacrylate | 1300 parts |
|---|---|
| Hydroquinone | 2.6 parts |
| Methylsulfuric acid | 5.6 parts |
| Toluene | 234 parts. |

After the dropping ended, the temperature was raised to 150° C., and the reaction was continued for about 5 hours until the acid value was lowered to not higher than 8.7. Thereafter the toluene was removed under reduced pressure until the heating residue reached at least 95%, to provide a fatty acid-modified monomer (a-4).

Preparation of Aqueous Resin Dispersions

The following components were put in a glass beaker and stirred with a dispersing device at 2,000 rpm for 15 minutes to provide a pre-emulsion. This pre-emulsion was high-pressure treated at 100 MPa with a high-pressure emulsifying apparatus in which the fluid was mutually collided with exertion of high pressure energy, to provide a monomeric emulsified product in which the average diameter of the dispersed particles was 190 nm.

| Composition of the monomeric emulsified product | |
|---|---|
| Fatty acid-modified monomer (a-1) | 30 parts |
| n-Butyl methacrylate | 25 parts |
| i-Butyl methacrylate | 27 parts |
| 2-Ethylhexyl methacrylate | 17 parts |
| Methacrylic acid | 1 part |
| "Newcol707 SF" (note 1) | 10 parts |
| Deionized water | 85 parts |

Then the monomeric emulsified product was transferred into a flask and diluted with deionized water to a solid concentration of 45%. After raising its temperature to 85° C., an aqueous initiator solution of 2 g of VA-086 (note 2) as dissolved in 64.7 g of deionized water was thrown into the flask, followed by 3 hours' stirring during which the same temperature was maintained. Thereafter an aqueous initiator solution of 0.5 g of VA-086 (note 2) as dissolved in 16.2 g of deionized water was added to the flask. While the same temperature was maintained, the content in the flask was stirred for an hour, cooled to 40° C., and its pH was adjusted to 8.0 with dimethylaminoethanol, to provide an aqueous resin dispersion (I-1) having a solid concentration of 40%, in which the dispersed resin had an average particle diameter of 185 nm.

(note 1) Newcol707SF: tradename, Nihon Emulsifier Co., an anionic emulsifier having polyoxyethylene chain; active component, 30%
(note 2) VA-086: tradename, Wako Pure Chemical Industries, Ltd., 2,2'-azobis[2-methyl-N-(2-hydroxyethyl)-propionamide]

Examples 2-14 and Comparative Example 1

In the manner identical with Example 1 except that the blended composition of monomeric emulsified product was changed as shown in Table 1, aqueous resin dispersions (I-2)-(I-14) and (I-15) were obtained.

product 2 g of VA-086 (note 2) was added, followed by stirring until the added polymerization initiator was dissolved. Separately, 0.08 g of Newcol707 SF (note 1) and 50 g of deionized water were put in a flask and heated to 85° C. While maintaining said temperature inside the flask, the monomeric emulsified product and an aqueous solution of 0.5 g of VA-086 as dissolved in 10 g of deionized water were dropped into the flask over 4 hours under stirring. After termination of the dropping, the system was aged for an hour and an aqueous initiator solution of 0.25 g of VA-086 (note 2) as dissolved in 3.0 g of deionized water was added into the flask. After further an hour's aging, an aqueous resin dispersion (I-16) was obtained. This aqueous resin dispersion left a large quantity of filtration residue. The residue was removed and

TABLE 1

| | | Example | | | | | | | | | | | | | | Comparative Example | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 1 | 2 |
| Composition | aqueous resin dispersion | I-1 | I-2 | I-3 | I-4 | I-5 | I-6 | I-7 | I-8 | I-9 | I-10 | I-11 | I-12 | I-13 | I-14 | I-15 | I-16 |
| | fatty acid-modified monomer (a-1) | 30 | | 30 | 30 | | | 30 | 30 | 30 | 30 | 60 | 30 | 40 | 30 | | 30 |
| | fatty acid-modified monomer (a-2) | | 30 | | | 30 | 30 | | | | | | | | | | |
| | styrene | | | | | | | | | | | | | | 15 | | |
| | n-butyl methacrylate | 25 | | 25 | 25 | | | | | | | | 25 | 10 | 25 | 37 | 25 |
| | i-butyl methacrylate | 27 | 27 | 27 | 27 | 27 | 27 | 24 | 24 | 24 | 24 | 15 | 25 | 14 | 27 | 37 | |
| | t-butyl methacrylate | | 25 | | | 25 | 25 | 22 | 22 | 22 | 22 | 22 | | | | | 27 |
| | 2-ethylhexyl methacrylate | 17 | 17 | 17 | 17 | 17 | 17 | 13 | 13 | 13 | 13 | | 20 | 20 | 17 | 25 | 17 |
| | methacrylic acid | 1 | 1 | 1 | 1 | 1 | 1 | 1 | 1 | 1 | 1 | 1 | | 1 | 1 | 1 | 1 |
| | diacetone acrylamide | | | | | | | 10 | 10 | 10 | 10 | | | | | | |
| | n-octyl-3-mercaptopropionate | | | | 0.5 | | 0.5 | | 0.5 | | 0.5 | | | | 0.5 | | |
| | DICNATE1000W (note 3) | | | 3.2 | 3.2 | 3.2 | 3.2 | | | 3.2 | 3.2 | | | | | | |
| | Newcol707SF (note 1) | 10 | 10 | 10 | 10 | 10 | 10 | 10 | 10 | 10 | 10 | 10 | 13.3 | 10 | 10 | 10 | 10 |
| | deionized water | 85 | 85 | 85 | 85 | 85 | 85 | 85 | 85 | 85 | 85 | 85 | 85 | 85 | 85 | 85 | 85 |
| Property values | glass transition temperature/° C. | 25.2 | 55 | 25.2 | 25.2 | 55 | 55 | 58.2 | 58.2 | 58.2 | 58.2 | 91.4 | 21 | 34.2 | 25.2 | 23.9 | 43.7 |
| | weight-average molecular weight | 150 thou. | 150 thou. | 150 thou. | 80 thou. | 150 thou. | 80 thou. | 150 thou. | 80 thou. | 150 thou. | 80 thou. | 150 thou. | 150 thou. | 150 thou. | 80 thou. | 150 thou. | 150 thou. |
| | oil length | 19.9 | 19.9 | 19.9 | 19.9 | 19.9 | 19.9 | 19.9 | 19.9 | 19.9 | 19.9 | 39.8 | 19.9 | 26.5 | 19.9 | 0 | 19.9 |
| | average particle diameter (nm) of monomeric emulsified product | 190 | 185 | 250 | 250 | 248 | 240 | 190 | 190 | 245 | 245 | 180 | 190 | 185 | 190 | 180 | 8100 |
| | average particle diameter (nm) of aqueous rein dispersion | 185 | 183 | 235 | 235 | 232 | 230 | 179 | 175 | 240 | 240 | 178 | 173 | 175 | 180 | 173 | 150 |

(note 3) DICNATE1000W: Tradename: Dainippon Ink & Chemicals, Inc., metallic dryer, Co content, 3.6%

Comparative Example 2

The monomers, an emulsifier and deionized water were put in a glass beaker at the blend ratio as indicated in Table 1, and stirred with dispersing device at 2,000 rpm for 15 minutes to provide a monomeric emulsified product. Average particle diameter of the particles dispersed in the monomeric emulsified product was 8,100 nm. To this monomeric emulsified the filtrate was sampled. In the diluted sample, the resin dispersed therein had an average particle diameter of 150 nm.

Comparative Example 3

Seventy 70 parts of toluene was put in a flask and heated to 100° C. A monomeric mixture of the following composition as prepared in a separate vessel was dropped into the flask over 4 hours under stirring, while said temperature was maintained. After termination of the dropping the system was aged for an hour, and an initiator solution of 5.0 g of t-butylperoxy-2-ethylhexanoate as dissolved in 1.0 g of toluene was added dropwise over an hour, followed by another hour's aging.

Thereafter the system was cooled to 40° C., to provide a fatty acid-modified acrylic resin. Per 100 g of the fatty acid-modified acrylic resin, 5 g of Newcol707 SF was added, stirred, and diluted with deionized water to the solid content of 33%. The mixture was given forced stirring to provide an aqueous dispersion, heated, and the toluene was removed under reduced pressure to provide an autoemulifiable aqueous resin dispersion (I-17).

| Composition of the monomeric mixture | |
|---|---|
| Fatty acid-modified monomer (a-1) | 30 parts |
| n-Butyl methacrylate | 25 parts |
| i-Butyl methacrylate | 27 parts |
| 2-Ethylhexyl methacrylate | 15 parts |
| Methacrylic acid | 3 parts |
| Toluene | 15 parts |
| t-Butyl peroxy-2-ethylhexanoate | 1.2 parts |

Example 15

The following components were put in a glass beaker and stirred with dispersing device at 2,000 rpm for 15 minutes to provide a pre-emulsion. The pre-emulsion was given a high pressure treatment with a high-pressure emulsifying apparatus in which the fluid was mutually collided under exertion of high-pressure energy at 100 MPa. Thus a monomeric emulsified product in which the dispersed particles had an average particle diameter of 190 nm was obtained.

| Composition of monomeric emulsified product | |
|---|---|
| Fatty acid-modified monomer (a-2) | 30.15 parts |
| Styrene | 15 parts |
| Hydroxyethyl methacrylate | 4.5 parts |
| i-Butyl methacrylate | 20.35 parts |
| t-Butyl methacrylate | 20 parts |
| 2-Ethylhexyl methacrylate | 8 parts |
| Methacrylic acid | 2 parts |
| Newcol707SF (note 1) | 10 parts |
| Deionized water | 85 parts |

Then the monomeric emulsified product was transferred to a flask and diluted with deionized water to the solid content of 45%. Then the temperature inside the flask was raised to 85° C., an aqueous initiator solution of 1.0 part of ammonium persulfate as dissolved in 15 parts of deionized water was thrown into the flask, and the content of the flask was stirred for 3 hours while said temperature was maintained. Then an aqueous initiator solution of 0.3 part of ammonium persulfate as dissolved in 2.7 parts of deionized water was added to the flask, followed by an hour's stirring while the same temperature was maintained. Then the system was cooled to 40° and its pH was adjusted to 8.0 with dimethylaminoethanol, to provide an aqueous resin dispersion (I-18) having a solid concentration of 40%. The resin dispersed therein had an average particle diameter of 165 nm.

Examples 16-33

Above Example 15 was repeated except that the blended composition was changed to those as indicated in the following Tables 2 and 3, to provide aqueous resin dispersions (I-19)-(I-36).

Comparative Example 4

The pre-emulsion as obtained in Example 1 was stirred with a dispersing machine having high shearing ability, at 10,000 rpm for 5 minutes, to provide a monomeric emulsified product in which the dispersed particles had an average particle diameter of 520 nm. Except the above operation same composition of blended components and procedures as Example 1 were used to provide an aqueous resin dispersion (I-37) in which the dispersed resin had an average particle diameter of 630 nm.

TABLE 2

| | | Example | | | | | | | |
|---|---|---|---|---|---|---|---|---|---|
| | | 15 | 16 | 17 | 18 | 19 | 20 | 21 | 22 |
| Composition | aqueous resin dispersion | I-18 | I-19 | I-20 | I-21 | I-22 | I-23 | I-24 | I-25 |
| | fatty acid-modified monomer (a-1) | | 30.15 | | | | | | |
| | fatty acid-modified monomer (a-2) | 30.15 | | 30.15 | 30.15 | 30.15 | 30.15 | 30.15 | 30.15 |
| | styrene | 15 | 15 | 15 | 15 | 15 | 15 | 15 | 15 |
| | hydroxyethyl methacrylate | 4.5 | 4.5 | 4.5 | 4.5 | 4.5 | 4.5 | 4.5 | 4.5 |
| | i-butyl methacrylate | 20.35 | 20.35 | 20.35 | 20.35 | 20.35 | 17.35 | 18.35 | 18.35 |
| | t-butyl methacrylate | 20 | 20 | 20 | 20 | 20 | 20 | 18 | 18 |
| | 2-ethylhexyl acrylate | 8 | 8 | | | | | | |
| | 2-ethylhexyl methacrylate | | | 8 | 8 | 8 | 8 | 8 | 8 |
| | methacrylic acid | 2 | 2 | | | | 2 | 2 | 2 |
| | acrylic acid | | | 2 | | | | | |
| | itaconic acid | | | | 2 | | | | |
| | diacetone acrylamide | | | | | | 3 | | |
| | cyclohexyl methacrylate | | | | | | | | |
| | RUVA-93 (note 4) | | | | | | | 2 | |
| | 4-(meth)acryloyloxy-1,2,2,6,6,-pentamethylpiperidine | | | | | | | 2 | |
| | TINUVINE 384-2 (note 5) | | | | | | | | 0.5 |
| | TINUVINE 123 (note 6) | | | | | | | | 0.5 |
| | n-octyl-3-mercaptopropionate | 0.3 | 0.3 | 0.3 | 0.3 | 0.3 | 0.3 | 0.3 | 0.3 |

TABLE 2-continued

|  |  | Example |  |  |  |  |  |  |  |
|---|---|---|---|---|---|---|---|---|---|
|  |  | 15 | 16 | 17 | 18 | 19 | 20 | 21 | 22 |
|  | cobalt naphthenate |  |  |  |  | 1.5 |  |  |  |
|  | zirconium octenate |  |  |  |  | 2 |  |  |  |
|  | calcium naphthenate |  |  |  |  | 1 |  |  |  |
|  | Newco1707SF (note 1) | 10 | 10 | 10 | 10 | 10 | 10 | 10 | 10 |
|  | deionized water | 85 | 85 | 85 | 85 | 85 | 85 | 85 | 85 |
| Property values | glass transition temperature | 63 | 63 | 70.7 | 71.5 | 72.9 | 73.3 | 72.4 | 72.4 |
|  | weight-average molecular weight | 110 thou. | 110 thou. | 110 thou. | 110 thou. | 110 thou. | 110 thou. | 110 thou. | 110 thou. |
|  | oil length | 20 | 20 | 20 | 20 | 20 | 20 | 20 | 20 |
|  | average particle diameter (nm) of monomeric emulsified product | 190 | 185 | 195 | 180 | 193 | 212 | 190 | 190 |
|  | average particle diameter (nm) of aqueous resin dispersion | 165 | 160 | 173 | 160 | 165 | 180 | 160 | 165 |

(note 4)
RUVA-93; tradename, Otsuka Chemical Co., 2-(2'-hydroxy-5'-methacryloxyethylphenyl-2H-benzotriazole
(note 5)
TINUVINE 384-2: tradename, Ciba Specialty Chemicals, a benzotriazole ultraviolet absorber
(note 6)
TINUVINE 123: tradename, Ciba Specialty Chemicals, a piperazine ultraviolet stabilizer

TABLE 3

|  |  | Example |  |  |  |  |  |  |  |  |  |  | Comparative Example |
|---|---|---|---|---|---|---|---|---|---|---|---|---|---|
|  |  | 23 | 24 | 25 | 26 | 27 | 28 | 29 | 30 | 31 | 32 | 33 | 4 |
| Composition | aqueous resin dispersion | I-26 | I-27 | I-28 | I-29 | I-30 | I-31 | I-32 | I-33 | I-34 | I-35 | I-36 | I-37 |
|  | fatty acid-modified monomer (a-1) |  |  |  |  |  |  |  |  |  |  |  | 30 |
|  | fatty acid-modified monomer (a-2) | 30.15 | 30.15 | 30.15 | 30.15 | 30.15 | 30.15 |  |  |  |  |  |  |
|  | fatty acid-modified monomer (a-3) |  |  |  |  |  |  | 33.33 | 33.33 | 33.33 | 33.33 |  |  |
|  | fatty acid-modified monomer (a-4) |  |  |  |  |  |  |  |  |  |  | 30 |  |
|  | Styrene | 15 | 15 | 12 | 15 | 15 | 15 | 15 | 15 | 15 | 15 |  |  |
|  | hydroxyethyl methacrylate | 4.5 |  |  |  |  |  |  |  |  |  |  |  |
|  | n-butyl methacrylate |  | 22.85 |  |  |  |  |  | 30 |  |  | 25 | 25 |
|  | i-butyl methacrylate | 10.35 |  |  |  |  |  |  |  |  |  | 27 | 27 |
|  | t-butyl methacrylate |  |  | 7.85 | 7.85 | 27.85 | 7 | 24.7 | 14.7 | 4.7 | 19.7 |  |  |
|  | 2-ehtylhexyl acrylate |  |  | 15 | 15 |  |  |  |  |  | 10 |  |  |
|  | 2-ehtylhexyl methacrylate | 8 |  |  | 20 |  | 10.85 | 20 |  |  | 20 | 17 | 17 |
|  | isostearyl acrylate |  |  |  |  |  | 5 |  |  |  |  |  | 1 |
|  | methacrylic acid | 2 | 2 | 2 | 2 | 2 | 2 | 2 | 2 | 2 | 2 | 1 |  |
|  | diacetone acrylamide |  |  | 3 |  |  |  | 5 | 5 | 5 | 5 |  |  |
|  | cyclohexyl methacrylate | 30 | 30 | 30 | 30 | 5 | 30 |  |  | 30 | 5 |  |  |
|  | n-octyl-3-mercaptopropionate | 0.3 | 0.5 | 0.5 | 0.5 | 0.3 | 0.5 | 0.3 | 0.3 | 0.5 | 0.3 |  |  |
|  | cobalt naphthenate |  |  |  | 1.5 |  |  |  |  |  |  |  |  |
|  | zirconium octenate |  |  |  | 2 |  |  |  |  |  |  |  |  |
|  | calcium naphthenate |  |  |  | 1 |  |  |  |  |  |  |  |  |
|  | Newco1707 SF (note 1) | 10 | 10 | 10 | 10 | 10 | 10 | 10 | 10 | 10 | 10 | 10 | 10 |
|  | deionized water | 85 | 85 | 85 | 85 | 85 | 85 | 85 | 85 | 85 | 85 | 85 | 85 |
| Property values | glass transition temperature/° C. | 67.6 | 64.1 | 46.8 | 48.2 | 66.7 | 55.7 | 63.1 | 61.8 | 57.7 | 60.8 | 25.2 | 25.2 |
|  | weight-average molecular weight | 110 thou. | 80 thou. | 80 thou. | 80 thou. | 110 thou. | 80 thou. | 110 thou. | 110 thou. | 80 thou. | 110 thou. | 150 thou. | 150 thou. |
|  | oil length | 20 | 20 | 20 | 20 | 20 | 20 | 20 | 20 | 20 | 20 | 19.9 | 19.9 |
|  | average particle diameter (nm) of monomeric | 185 | 185 | 190 | 195 | 185 | 205 | 210 | 210 | 220 | 205 | 190 | 520 |

TABLE 3-continued

|  | Example | | | | | | | | | | | Comparative Example |
|---|---|---|---|---|---|---|---|---|---|---|---|---|
|  | 23 | 24 | 25 | 26 | 27 | 28 | 29 | 30 | 31 | 32 | 33 | 4 |
| emulsified product average particle diameter (nm) of aqueous resin dispersion | 170 | 210 | 175 | 180 | 165 | 195 | 185 | 250 | 200 | 185 | 185 | 630 |

Preparation of Aqueous Resin Compositions

Examples 34-66 and Comparative Examples 5-8

Aqueous resin compositions were obtained at the blend ratios as indicated in the following Table 4. Storage stability and transparency of each of the aqueous resin compositions were evaluated according to the following standards. The results are concurrently shown in Table 4.

TABLE 4

|  |  | Example | | | | | | | | | | | | |
|---|---|---|---|---|---|---|---|---|---|---|---|---|---|
|  |  | 34 | 35 | 36 | 37 | 38 | 39 | 40 | 41 | 42 | 43 | 44 | 45 | 46 |
| Composition | aqueous resin dispersion | I-1 | I-2 | I-3 | I-4 | I-5 | I-6 | I-7 | I-8 | I-9 | I-10 | I-11 | I-12 | I-13 |
|  | aqueous resin dispersion, amount | 250 | 250 | 253 | 253 | 253 | 253 | 250 | 250 | 253 | 253 | 250 | 250 | 250 |
|  | DICNATE 1000W (note 3) | 3.2 | 3.2 |  |  |  |  | 3.2 | 3.2 |  |  | 3.2 | 3.2 | 3.2 |
|  | adipic acid dihydrazide | 0.25 | 0.25 | 0.25 | 0.25 | 0.25 | 0.25 | 3.25 | 3.25 | 3.25 | 3.25 | 0.25 | 0.25 | 0.25 |
|  | TEXANOL (note 7) | 15 | 15 | 15 | 15 | 15 | 15 | 15 | 15 | 15 | 15 | 15 | 15 | 15 |
| Evaluation | transmission haze value | 0.00 | 0.00 | 0.09 | 0.08 | 0.08 | 0.07 | 0.00 | 0.00 | 0.09 | 0.08 | 0.05 | 0.00 | 0.05 |
|  | storage stability | ○ | ○ | ○ | ○ | ○ | ○ | ○ | ○ | ○ | ○ | ○ | ○Δ | ○ |

|  |  | Example | | | | | | | | | | | | |
|---|---|---|---|---|---|---|---|---|---|---|---|---|---|
|  |  | 47 | 48 | 49 | 50 | 51 | 52 | 53 | 54 | 55 | 56 | 57 | 58 | 59 |
| Composition | aqueous resin dispersion | I-14 | I-18 | I-19 | I-20 | I-21 | I-22 | I-23 | I-24 | I-25 | I-26 | I-27 | I-28 | I-29 |
|  | aqueous resin dispersion, amount | 250 | 250 | 250 | 250 | 250 | 253 | 250 | 250 | 250 | 250 | 250 | 250 | 253 |
|  | DICNATE 1000W (note 3) | 3.2 | 3.2 | 3.2 | 3.2 | 3.2 |  | 3.2 | 3.2 | 3.2 | 3.2 | 3.2 | 3.2 |  |
|  | adipic acid dihydrazide | 0.25 | 0.25 | 0.25 | 0.25 | 0.25 | 0.25 | 3.25 | 0.25 | 0.25 | 0.25 | 0.25 | 3.25 | 0.25 |
|  | TEXANOL (note 7) | 15 | 15 | 15 | 15 | 15 | 15 | 15 | 15 | 15 | 15 | 15 | 15 | 15 |
| Evaluation | transmission haze value | 0.00 | 0.00 | 0.08 | 0.09 | 0.08 | 0.10 | 0.08 | 0.08 | 0.03 | 0.05 | 0.03 | 0.05 | 0.03 |
|  | storage stability | ○ | ○ | ○ | ○ | ○ | ○Δ | ○ | ○ | ○ | ○ | ○ | ○ | ○ |

|  |  | Example | | | | | | | Comparative example | | | |
|---|---|---|---|---|---|---|---|---|---|---|---|---|
|  |  | 60 | 61 | 62 | 63 | 64 | 65 | 66 | 5 | 6 | 7 | 8 |
| Composition | aqueous resin dispersion | I-30 | I-31 | I-32 | I-33 | I-34 | I-35 | I-36 | I-15 | I-16 | I-17 | I-37 |
|  | aqueous resin dispersion, amount | 250 | 250 | 250 | 250 | 250 | 250 | 250 | 250 | 250 | 200 | 250 |
|  | DICNATE 1000W (note 3) | 3.2 | 3.2 | 3.2 | 3.2 | 3.2 | 3.2 | 3.2 |  | 3.2 | 3.2 | 3.2 |

TABLE 4-continued

|  |  |  |  |  |  |  |  |  |  |  |  |
|---|---|---|---|---|---|---|---|---|---|---|---|
|  | adipic acid dihydrazide | 0.25 | 0.25 | 5.25 | 5.25 | 5.25 | 5.25 | 0.25 | 0.25 | 0.25 | 0.25 | 0.25 |
|  | TEXANOL (note 7) | 15 | 15 | 15 | 15 | 15 | 15 | 15 | 15 | 15 | 15 | 15 |
| Evaluation | transmission haze value | 0.03 | 0.00 | 0.08 | 0.08 | 0.09 | 0.08 | 0.00 | 0.00 | 6.85 | 1.35 | 3 |
|  | storage stability | ○ | ○ | ○ | ○ | ○ | ○ | ○ | ○ | ○ | ○Δ | X |

(note 7)
TEXANOL: tradename, Eastman Chemical Co., 2,2,4-trimethyl-1,3-pentanediol monoisobutyrate, film-forming assistant (*1) Transparency Transparency was evaluated by measuring transmission haze value. Onto an OHP sheet whose transmission haze value had been measured in advance with COH-300A (tradename, Nippon Denshoku Kogyo, a color difference-turbidity measuring machine), each aqueous resin composition was applied to a dry film thickness of 20 µm, and aged for 20° C. for a week to provide test specimens. Transmission haze values of these test specimens were measured with COH-300A (tradename, Nippon Denshoku Kogyo, a color difference-turbidity measuring machine). Subtracting from the measured values the transmission haze value of the OHP sheet, the remaining values were indicated as transparency of the respective test specimens. Lower values signify better transparency.

(*2) Storage Stability

One (1) kg of each of the aqueous resin compositions was put in 1 L-capacity can with coated inner surface, sealed in nitrogen atmosphere and stored for 30 days at 40° C. Thereafter the temperature was dropped to ambient level. Condition of the compositions in the containers was visually observed and evaluated according to the following standards.

○: Initial state was retained and no change occurred.
○Δ: Soft caking or varnish separation was observed but initial state was restored when stirred.
X: Viscosity increased.

Preparation of Water-based Paint Compositions

Examples 67-100 and Comparative Examples 9-12

Those components as shown under Composition (A) in Table 5 were successively charged in a container each and stirred with a dispersing device for 30 minutes to homogeneity to provide pigment pastes. Then the aqueous resin dispersions (I-1)-(I-37) were each added to the pigment pastes, followed by successive addition of the components as shown under Composition (B) in Table 5, to provide water-based paint compositions. The compositions were then evaluated according to the following standards. The results are also shown in Table 5 concurrently with the water-based paint compositions' property values.

TABLE 5

|  |  | Example |  |  |  |  |  |  |  |  |
|---|---|---|---|---|---|---|---|---|---|---|
|  |  | 67 | 68 | 69 | 70 | 71 | 72 | 73 | 74 | 75 |
| Composition (A) | city water | 40 | 40 | 40 | 40 | 40 | 40 | 40 | 40 | 40 |
|  | ethylene glycol | 2 | 2 | 2 | 2 | 2 | 2 | 2 | 2 | 2 |
|  | SURAOFF 72N (note 8) | 0.8 | 0.8 | 0.8 | 0.8 | 0.8 | 0.8 | 0.8 | 0.8 | 0.8 |
|  | NOPCOSANT K (note 9) | 2 | 2 | 2 | 2 | 2 | 2 | 2 | 2 | 2 |
|  | ADEKANOL UH-438 (note 10) | 0.8 | 0.8 | 0.8 | 0.8 | 0.8 | 0.8 | 0.8 | 0.8 | 0.8 |
|  | Titanium White JR-600A (note 11) | 102.4 | 102 | 102.4 | 102 | 102 | 102 | 102 | 102.4 | 102 |
|  | SUNLITE SL-1500 (note 12) | 10 |  |  | 10 | 10 | 10 | 10 |  |  |
|  | LF BOUSEI P-W-2 (note 13) |  | 13 |  |  |  |  |  | 13 | 13 |
|  | SN Defoamer 380 (note 14) | 0.8 | 0.8 | 0.8 | 0.8 | 0.8 | 0.8 | 0.8 | 0.8 | 0.8 |
|  | aqueous resin dispersion | I-1 | I-1 | I-2 | I-3 | I-4 | I-5 | I-6 | I-7 | I-8 |
|  | aqueous resin dispersion, amount | 250 | 250 | 250 | 253.2 | 253.2 | 253.2 | 253.2 | 250 | 250 |
| Composition (B) | DICNATE 1000W (note 3) | 3.2 | 3.2 | 3.2 |  |  |  |  | 3.2 | 3.2 |
|  | adipic acid dihydrazide | 0.25 | 0.25 | 0.25 | 0.25 | 0.25 | 0.25 | 0.25 | 3.25 | 3.25 |
|  | TEXANOL (note 7) | 15 | 15 | 15 | 15 | 15 | 15 | 15 | 15 | 15 |
|  | SN Deforamer 380 (note 14) | 2 | 2 | 2 | 2 | 2 | 2 | 2 | 2 | 2 |
|  | ADEKANOL UH-438 (note 10) | 2 | 2 | 2 | 2 | 2 | 2 | 2 | 2 | 2 |
|  | sodium nitrite | 0.5 | 0.5 | 0.5 | 0.5 | 0.5 | 0.5 | 0.5 | 0.5 | 0.5 |
| Property values | Titanium White PVC | 19 | 19 | 20 | 19 | 19 | 19 | 19 | 19 | 19 |
|  | anti-rusting pigment PVC |  | 3 |  |  |  |  |  | 3 | 3 |
|  | total pigment PVC | 22 | 22 | 20 | 22 | 22 | 22 | 22 | 22 | 22 |
| Evaluation | hardenability | 82 | 83 | 83 | 87 | 85 | 88 | 86 | 87 | 86 |
|  | thick appearance | ○ | ○ | ○ | ○ | ○ | ○ | ○ | ○ | ○ |
|  | gloss (60° G) | 85 | 84 | 85 | 83 | 88 | 84 | 88 | 86 | 88 |
|  | water resistance | ○ | ○ | ○ | ○ | ○ | ○ | ○ | ○ | ○ |
|  | corrosion resistance | ○ | ○ | ○ | ○ | ○ | ○ | ○ | ○ | ○ |

TABLE 5-continued

| | | 8 points | 8 points | 8 points | 8 points | 8 points | 8 points | 8 points | 8 points | 8 points |
|---|---|---|---|---|---|---|---|---|---|---|
| | accelerated weatherability | | | | | | | | | |

| | | \multicolumn{9}{c}{Example} |
|---|---|---|---|---|---|---|---|---|---|---|

| | | Example 76 | 77 | 78 | 79 | 80 | 81 | 82 | 83 | 84 |
|---|---|---|---|---|---|---|---|---|---|---|
| Composition (A) | city water | 40 | 40 | 40 | 40 | 40 | 40 | 40 | 40 | 40 |
| | ethylene glycol | 2 | 2 | 2 | 2 | 2 | 2 | 2 | 2 | 2 |
| | SURAOFF 72N (note 8) | 0.8 | 0.8 | 0.8 | 0.8 | 0.8 | 0.8 | 0.8 | 0.8 | 0.8 |
| | NOPCOSANT K (note 9) | 2 | 2 | 2 | 2 | 2 | 2 | 2 | 2 | 2 |
| | ADEKANOL UH-438 (note 10) | 0.8 | 0.8 | 0.8 | 0.8 | 0.8 | 0.8 | 0.8 | 0.8 | 0.8 |
| | Titanium White JR-600A (note 11) | 102 | 102 | 102.4 | 102.4 | 102.4 | 102.4 | 102 | 102 | 102 |
| | SUNLITE SL-1500 (note 12) | | | 10 | 10 | 10 | 10 | 10 | 10 | 10 |
| | LF BOUSEI P-W-2 (note 13) | 13 | 13 | | | | | 13 | 13 | 13 |
| | SN Defoamer 380 (note 14) | 0.8 | 0.8 | 0.8 | 0.8 | 0.8 | 0.8 | 0.8 | 0.8 | 0.8 |
| | aqueous resin dispersion | I-9 | I-10 | I-11 | I-12 | I-13 | I-14 | I-18 | I-19 | I-20 |
| | aqueous resin dispersion, amount | 253.2 | 253.2 | 250 | 250 | 250 | 250 | 250 | 250 | 250 |
| Composition (B) | DICNATE 1000W (note 3) | | | 3.2 | 3.2 | 3.2 | 3.2 | 3.2 | 3.2 | 3.2 |
| | adipic acid dihydrazide | 3.25 | 3.25 | 0.25 | 0.25 | 0.25 | 0.25 | 0.25 | 0.25 | 0.25 |
| | TEXANOL (note 7) | 15 | 15 | 15 | 15 | 15 | 15 | 15 | 15 | 15 |
| | SN Deforamer 380 (note 14) | 2 | 2 | 2 | 2 | 2 | 2 | 2 | 2 | 2 |
| | ADEKANOL UH-438 (note 10) | 2 | 2 | 2 | 2 | 2 | 2 | 2 | 2 | 2 |
| | sodium nitrite | 0.5 | 0.5 | 0.5 | 0.5 | 0.5 | 0.5 | 0.5 | 0.5 | 0.5 |
| Property values | Titanium White PVC | 19 | 19 | 19 | 19 | 19 | 19 | 19 | 19 | 19 |
| | anti-rusting pigment PVC | 3 | 3 | | | | | 3 | 3 | 3 |
| | total pigment PVC | 22 | 22 | 22 | 22 | 22 | 22 | 22 | 22 | 22 |
| Evaluation | hardenability | 90 | 88 | 85 | 81 | 82 | 86 | 85 | 83 | 84 |
| | thick appearance | ○ | ○ | ◎ | ○ | ○ | ○ | ○ | ○ | ○ |
| | gloss (60° G) | 85 | 88 | 89 | 85 | 87 | 89 | 85 | 84 | 85 |
| | water resistance | ○ | ○ | ○ | ○ | ○ | ○ | ◎ | ◎ | ◎ |
| | corrosion resistance | ○ | ○ | ○ | ○ | ○ | ○ | ○ | ○ | ○ |
| | accelerated weatherability | 8 points | 8 points | 8 points | 8 points | 8 points | 8 points | 8 points | 8 points | 8 points |

| | | Example 85 | 86 | 87 | 88 | 89 | 90 | 91 | 92 | 93 | 94 |
|---|---|---|---|---|---|---|---|---|---|---|---|
| Composition (A) | city water | 40 | 40 | 40 | 40 | 40 | 40 | 40 | 40 | 40 | 40 |
| | ethylene glycol | 2 | 2 | 2 | 2 | 2 | 2 | 2 | 2 | 2 | 2 |
| | SURAOFF 72N (note 8) | 0.8 | 0.8 | 0.8 | 0.8 | 0.8 | 0.8 | 0.8 | 0.8 | 0.8 | 0.8 |
| | NOPCOSANT K (note 9) | 2 | 2 | 2 | 2 | 2 | 2 | 2 | 2 | 2 | 2 |
| | ADEKANOL UH-438 (note 10) | 0.8 | 0.8 | 0.8 | 0.8 | 0.8 | 0.8 | 0.8 | 0.8 | 0.8 | 0.8 |
| | Titanium White JR-600A (note 11) | 102 | 102 | 102 | 102 | 102 | 102 | 102 | 102 | 102 | 102 |
| | SUNLITE SL-1500 (note 12) | 10 | 10 | 10 | 10 | 10 | 10 | 10 | 10 | 10 | 10 |
| | LF BOUSEI P-W-2 (note 13) | 13 | 13 | 13 | 13 | 13 | 13 | | | | |
| | SN Defoamer 380 (note 14) | 0.8 | 0.8 | 0.8 | 0.8 | 0.8 | 0.8 | 0.8 | 0.8 | 0.8 | 0.8 |
| | aqueous resin dispersion | I-21 | I-22 | I-23 | I-24 | I-25 | I-26 | I-27 | I-28 | I-29 | I-30 |
| | aqueous resin dispersion, amount | 250 | 250 | 250 | 250 | 250 | 250 | 250 | 250 | 253 | 250 |
| Composition (B) | DICNATE 1000W (note 3) | 3.2 | | 3.2 | 3.2 | 3.2 | 3.2 | 3.2 | 3.2 | | 3.2 |
| | adipic acid dihydrazide | 0.25 | 0.25 | 3.25 | 0.25 | 0.25 | 0.25 | 0.25 | 3.25 | 0.25 | 0.25 |
| | TEXANOL (note 7) | 15 | 15 | 15 | 15 | 15 | 15 | 15 | 15 | 15 | 15 |
| | SN Deforamer 380 (note 14) | 2 | 2 | 2 | 2 | 2 | 2 | 2 | 2 | 2 | 2 |
| | ADEKANOL UH-438 (note 10) | 2 | 2 | 2 | 2 | 2 | 2 | 2 | 2 | 2 | 2 |
| | sodium nitrite | 0.5 | 0.5 | 0.5 | 0.5 | 0.5 | 0.5 | 0.5 | 0.5 | 0.5 | 0.5 |
| Property values | Titanium White PVC | 19 | 19 | 20 | 19 | 19 | 19 | 19 | 19 | 19 | 19 |
| | anti-rusting pigment PVC | 3 | 3 | 3 | 3 | 3 | 3 | | | | |

TABLE 5-continued

|  |  | | | | | | | | | | |
|---|---|---|---|---|---|---|---|---|---|---|---|
| Evaluation | total pigment PVC | 22 | 22 | 22 | 22 | 22 | 22 | 22 | 22 | 22 | 22 |
|  | hardenability | 84 | 89 | 91 | 82 | 84 | 86 | 87 | 86 | 90 | 86 |
|  | thick appearance | ○ | ○ | ○ | ○ | ○ | ○ | ○ | ○ | ○ | ○ |
|  | gloss (60° G) | 84 | 86 | 83 | 85 | 85 | 88 | 88 | 89 | 87 | 88 |
|  | water resistance | ◎ | ◎ | ◎ | ◎ | ◎ | ◎ | ○ | ○ | ○ | ○ |
|  | corrosion resistance | ○ | ○ | ○ | ○ | ○ | ○ | ○ | ○ | ○ | ○ |
|  | accelerated weatherability | 8 points | 8 points | 10 points | 9 points | 9 points | 10 points | 10 points | 10 points | 10 points | 8 points |

|  |  | Example | | | | | | Comparative example | | | |
|---|---|---|---|---|---|---|---|---|---|---|---|
|  |  | 95 | 96 | 97 | 98 | 99 | 100 | 9 | 10 | 11 | 12 |
| Composition (A) | city water | 40 | 40 | 40 | 40 | 40 | 40 | 40 | 40 | 40 | 40 |
|  | ethylene glycol | 2 | 2 | 2 | 2 | 2 | 2 | 2 | 2 | 2 | 2 |
|  | SURAOFF 72N (note 8) | 0.8 | 0.8 | 0.8 | 0.8 | 0.8 | 0.8 | 0.8 | 0.8 | 0.8 | 0.8 |
|  | NOPCOSANT K (note 9) | 2 | 2 | 2 | 2 | 2 | 2 | 2 | 2 | 2 | 2 |
|  | ADEKANOL UH-438 (note 10) | 0.8 | 0.8 | 0.8 | 0.8 | 0.8 | 0.8 | 0.8 | 0.8 | 0.8 | 0.8 |
|  | Titanium White JR-600A (note 11) | 102 | 102 | 102 | 102 | 102 | 102 | 102 | 102 | 102 | 102.4 |
|  | SUNLITE SL-1500 (note 12) | 10 | 10 | 10 | 10 | 10 | 10 | 10 | 10 | 10 | 10 |
|  | LF BOUSEI P-W-2 (note 13) | 13 | 13 | 13 | 13 | 13 | 13 | 13 | 13 | 13 | 13 |
|  | SN Defoamer 380 (note 14) | 0.8 | 0.8 | 0.8 | 0.8 | 0.8 | 0.8 | 0.8 | 0.8 | 0.8 | 0.8 |
|  | aqueous resin dispersion | I-31 | I-32 | I-33 | I-34 | I-35 | I-36 | I-15 | I-16 | I-17 | I-37 |
|  | aqueous resin dispersion, amount | 250 | 250 | 250 | 250 | 250 | 250 | 250 | 250 | 200 | 250 |
| Composition (B) | DICNATE 1000W (note3) | 3.2 | 3.2 | 3.2 | 3.2 | 3.2 | 3.2 |  | 3.2 | 3.2 | 3.2 |
|  | adipic acid dihydrazide | 0.25 | 5.25 | 5.25 | 5.25 | 5.25 | 0.25 | 0.25 | 0.25 | 0.25 | 0.25 |
|  | TEXANOL (note 7) | 15 | 15 | 15 | 15 | 15 | 15 | 15 | 15 | 15 | 15 |
|  | SN Deforamer 380 (note 14) | 2 | 2 | 2 | 2 | 2 | 2 | 2 | 2 | 2 | 2 |
|  | ADEKANOL UH-438 (note 10) | 2 | 2 | 2 | 2 | 2 | 2 | 2 | 2 | 2 | 2 |
|  | sodium nitrite | 0.5 | 0.5 | 0.5 | 0.5 | 0.5 | 0.5 | 0.5 | 0.5 | 0.5 | 0.5 |
| Property values | Titanium White PVC | 19 | 19 | 19 | 19 | 19 | 19 | 19 | 19 | 19 | 19 |
|  | anti-rusting pigment PVC | 3 | 3 | 3 | 3 | 3 | 3 | 3 | 3 | 3 | 3 |
|  | total pigment PVC | 22 | 22 | 22 | 22 | 22 | 22 | 22 | 20 | 22 | 22 |
| Evaluation | hardenability | 88 | 78 | 78 | 75 | 77 | 82 | 60 | 80 | 82 | 78 |
|  | thick appearance | ○ | ○ | ○ | ○ | ○ | ○ | Δ | ○ | ○ | Δ |
|  | gloss (60° G) | 88 | 80 | 82 | 82 | 81 | 85 | 87 | 74 | 78 | 54 |
|  | water resistance | ◎ | ◎ | ○ | ○ | ○ | ○ | Δ | Δ | Δ | Δ |
|  | corrosion resistance | ○ | ○ | ○ | ○ | ○ | ○ | Δ | Δ | Δ | Δ |
|  | accelerated weatherability | 10 points | 8 points | 8 points | 10 points | 8 points | 8 points | 8 points | 8 points | 8 points | 7 points |

(note 8)
SURAOFF 72N: tradename, Tekeda Chemical Industries, Ltd., antiseptic
(note 9)
NOPCOSANT K: tradename, San Nopco Co., pigment dispersing agent
(note 10)
ADEKANOL UH-438: tradename, Adeka Co., thickener
(note 11)
Titaniun White JR-600A: tradename, TAYCA Corporation, titanium white, specific gravity = 4.1
(note 12)
SUNLITE SL-1500: tradename, Takehara Chemicals Co, calcium carbonate, specific gravity = 2.7
(note 13)
LF BOUSEI P-W-2: tradename, Kikuchi Color Co., zinc phosphate-based anti-rusting agent, specific gravity = 3.5
(note 14)
SN Deforamer 380: tradename, San Nopco Co., defoaming agent (*3) Hardenability Each of the water-based paint compositions was applied onto exfoliate paper to a film thickness of 20μ and dried for a week. Then released coating film was put in 20° C. acetone solvent and extracted for 24 hours. The residual ratio (%) after the extraction was examined. Higher values indicate better hardenability.

(*4) Thick Appearance

Each of the water-based paint compositions was applied onto glass sheet with a 6-mil doctor blade and dried under the conditions of temperature, 20° C. and relative humidity, 60%. The test-coated sheet samples were visually evaluated after one day of the application:
⊙ excellent thick appearance
○ good thick appearance
Δ poor thick appearance.

(*5) Gloss

Gloss at 60° of the test coated sheet samples as obtained in the same manner as in above (*4) was measured. Higher values indicate better gloss.

(*6) Water Resistance

Steel sheet (150×70×0.8 mm) meeting JIS K 5410 rating was degreased with xylene, and onto which each of the water-based paint compositions as diluted with city water to about 70 KU was applied with brush at an application rate of 150 g/m$^2$, followed by a week's drying at 20° C. and relative humidity of 60%, to provide test panels. The test panels were given a water resistance test (96 hour's immersion) following JIS K 5400-8.19. Conditions of the coated panel surfaces after the test were evaluated according to the following standard.
⊙: No cracking or peeling occurred and the gloss retention was no less than 70%.
○: No cracking or peeling occurred and the gloss retention was no less than 60%.
Δ: At least one of above criteria was not satisfied.

(*7) Corrosion Resistance

As the substrate material a steel sheet (150×70×0.8 mm) meeting JIS K 5410 rating, which was degreased with xylene was used. Each of the water-based paint compositions was diluted with city water to about 70 KU, and applied onto the steel sheet with brush at an application rate of 100 g/m$^2$.

After a day's drying, second time application was conducted in the manner identical with the first time application, and dried for 7 days under the conditions of 20° C. and relative humidity of 60% to provide test panels. The test panels were subjected to 36 cycles of the composite cycle anti-corrosion test as specified by JIS K 5621, and thereafter the coated surfaces were evaluated according to the following criteria:
○: No rust found on the coated surface
Δ: Rust found on a part of the coated surface
X: Rust found over the whole of the coated surface.

(*8) Accelerated Weatherability

Test panels prepared in the same manner as those for the corrosion test were irradiated for 1,000 hours according to the acclerated weatherability test as specified by JIS K 5400-9.8.1 (Sunshine carbon arc lamp system). Thereafter the coated surfaces were evaluated by degree of chalking according to JIS K5400-9.6. Lower evaluation points indicate more advanced degree of chalking.

The invention claimed is:

1. A process for producing an aqueous resin dispersion in which the average particle diameter of the dispersed resin is not more than 500 nm, comprising finely dispersing a monomeric mixture (I) containing (A) fatty acid-modified polymerizable unsaturated monomer and (B) other polymerizable unsaturated monomer which is copolymerizable with the monomer (A) in an aqueous medium in such a manner that the dispersed particles have an average particle diameter not more than 500 nm, and polymerizing the resulting emulsified product and wherein the other polymerizable unsaturated monomer (B) contains polymerizable unsaturated monomer (b3) which contains straight chain or branched chain hydrocarbon group having at least 6 carbon atoms, at a ratio within a range of 1-30% by weight, based on the combined weight of the fatty acid-modified polymerizable unsaturated monomer (A) and other polymerizable unsaturated monomer (B).

2. A process for producing an aqueous resin dispersion in which the average particle diameter of the dispersed resin is not more than 500 nm, comprising mini-emulsion polymerizing a monomeric mixture (I) containing (A) fatty acid-modified polymerizable unsaturated monomer and (B) other polymerizable unsaturated monomer which is copolymerizable with the monomer (A) and wherein the other polymerizable unsaturated monomer (B) contains polymerizable unsaturated monomer (b3) which contains straight chain or branched chain hydrocarbon group having at least 6 carbon atoms, at a ratio within a range of 1-30% by weight, based on the combined weight of the fatty acid-modified polymerizable unsaturated monomer (A) and other polymerizable unsaturated monomer (B).

3. A process as set forth in claim 1, in which the fatty acid-modified polymerizable unsaturated monomer (A) is a reaction product of fatty acid (a1) with epoxy-containing polymerizable unsaturated monomer (a2) or hydroxyl-containing polymerizable unsaturated monomer (a3).

4. A process as set forth in claim 1, in which the composition of the other polymerizable unsaturated monomer (B) is so selected that the theoretical glass transition temperature of the (co)polymer of all the other polymerizable unsaturated monomer or monomers constituting the monomer (B) falls within a range of 0-100° C.

5. A process as set forth in claim 1, in which the other polymerizable unsaturated monomer (B) contains carboxyl-containing polymerizable unsaturated monomer (b1) at a ratio within a range of 0.1-5% by weight, based on the combined weight of the fatty acid-modified polymerizable unsaturated monomer (A) and other polymerizable unsaturated monomer (B).

6. A process as set forth in claim 1, in which the other polymerizable unsaturated monomer (B) comprises carboxyl-containing polymerizable unsaturated monomer (b1), polymerizable unsaturated monomer (b2) which contains a hydrocarbon group of at least 4 carbon atoms, and polymerizable unsaturated monomer (b7) other than the fatty acid-modified polymerizable unsaturated monomer (A), above monomer (b 1) and monomer (b2), and in which the monomeric mixture (I) contains, based on the combined weight of the monomers (A) and (B), 5-50% by weight of monomer (A), 0.1-5% by weight of monomer (b 1), 45-80% by weight of monomer (b2) and 0-49.9% by weight of the other polymerizable unsaturated monomer (b7), said polymerizable unsaturated monomer (b2) having a hydrocarbon group of at least 4 carbon atoms containing polymerizable unsaturated monomer (b3) having a straight chain or branched chain hydrocarbon group of at least 6 carbon atoms within a range of 1-30% by weight based on the combined weight of the monomers A and B.

7. A process as set forth in claim 1, in which the other polymerizable unsaturated monomer (B) comprises cycloalkyl-containing polymerizable unsaturated monomer (b4).

8. A process as set forth in claim 1, in which the other polymerizable unsaturated monomer (B) comprises cycloalkyl-containing polymerizable unsaturated monomer (b4), aromatic vinyl monomer (b5), and other polymerizable unsaturated monomer (b8) other than above monomer (A), monomer (b4) and monomer (b5): and in which the monomeric mixture (I) contains, based on the combined weight of the monomers (A) and (B), 5-50% by weight of monomer (A), 1-70% by weight of monomer (b4), 1-50% by weight of monomer (b5), and 0-93% by weight of the other polymerizable unsaturated monomer (b8).

9. A process as set forth in claim 1, in which the other polymerizable unsaturated monomer (B) comprises carbonyl-containing polymerizable unsaturated monomer (b6).

10. A process as set forth in claim 3, in which the fatty acid (a1) is selected from semi-drying oil fatty acid and non-drying oil fatty acid.

11. A process as set forth in claim 1, in which the monomeric mixture (I) further comprises a compound which contains substantially no polymerizable unsaturated group.

12. A process as set forth in claim 11, in which the compound containing substantially no polymerizable unsaturated group is at least one selected from ultraviolet absorber, ultraviolet stabilizer and metallic dryer.

13. Aqueous resin dispersions prepared by a process as set forth in claim 1.

14. Aqueous resin compositions which comprise the aqueous resin dispersions as set forth in claim 13.

15. Aqueous resin compositions as set forth in claim 14, which further comprise hydrazine derivatives.

16. Aqueous resin compositions as set forth in claim 14, which form hardened coating film having a transmission haze value not higher than 5.

17. Water-based paint compositions which comprise the aqueous resin compositions as set forth in claim 14.

18. Water-based paint compositions as set forth in claim 17, which further comprise titanium white at a pigment volumetric concentration within a range of 5-25%.

19. Water-based paint compositions as set forth in claim 17, which further comprise phosphoric acid-derived pigment at a pigment volumetric concentration within a range of 1-10%.

20. Water-based paint compositions as set forth in claim 17, which further comprise at least one kind of compound selected from the group consisting of nitrous acid salt, phytic acid salt, tannic acid salt and polyamine compound.

21. A coating film-forming method which comprises applying a water-based paint composition as set forth in claim 17 onto a substrate surface to be coated.

22. A coating film-forming method as set forth in claim 21, in which the surface to be coated is that of an iron substrate or a coated surface of an iron substrate.

23. Coated articles formed by the method as set forth in claim 21.

24. A process as set forth in claim 2, in which the fatty acid-modified polymerizable unsaturated monomer (A) is a reaction product of fatty acid (a1) with epoxy-containing polymerizable unsaturated monomer (a2) or hydroxyl-containing polymerizable unsaturated monomer (a3).

25. A process as set forth in claim 2, in which the composition of the other polymerizable unsaturated monomer (B) is so selected that the theoretical glass transition temperature of the (co)polymer of all the other polymerizable unsaturated monomer or monomers constituting the monomer (B) falls within a range of 0-100° C.

26. A process as set forth in claim 2, in which the other polymerizable unsaturated monomer (B) contains carboxyl-containing polymerizable unsaturated monomer (b1) at a ratio within a range of 0.1-5% by weight, based on the combined weight of the fatty acid-modified polymerizable unsaturated monomer (A) and other polymerizable unsaturated monomer (B).

27. A process as set forth in claim 2, in which the other polymerizable unsaturated monomer (B) comprises carboxyl-containing polymerizable unsaturated monomer (b1), polymerizable unsaturated monomer (b2) which contains a hydrocarbon group of at least 4 carbon atoms, and polymerizable unsaturated monomer (b7) other than the fatty acid-modified polymerizable unsaturated monomer (A), above monomer (b 1) and monomer (b2), and in which the monomeric mixture (I) contains, based on the combined weight of the monomers (A) and (B), 5-50% by weight of monomer (A), 0.1-5% by weight of monomer (b 1), 45-80% by weight of monomer (b2) and 0-49.9% by weight of the other polymerizable unsaturated monomer (b7), said polymerizable unsaturated monomer (b2) having a hydrocarbon group of at least 4 carbon atoms containing polymerizable unsaturated monomer (b3) having a straight chain or branched chain hydrocarbon group of at least 6 carbon atoms within a range of 1-30% by weight based on the combined weight of the monomers A and B.

28. A process as set forth in claim 2, in which the other polymerizable unsaturated monomer (B) comprises cycloalkyl-containing polymerizable unsaturated monomer (b4).

29. A process as set forth in claim 2, in which the other polymerizable unsaturated monomer (B) comprises cycloalkyl-containing polymerizable unsaturated monomer (b4), aromatic vinyl monomer (b5), and other polymerizable unsaturated monomer (b8) other than above monomer (A), monomer (b4) and monomer (b5): and in which the monomeric mixture (I) contains, based on the combined weight of the monomers (A) and (B), 5-50% by weight of monomer (A), 1-70% by weight of monomer (b4), 1-50% by weight of monomer (b5), and 0-93% by weight of the other polymerizable unsaturated monomer (b8).

30. A process as set forth in claim 2, in which the other polymerizable unsaturated monomer (B) comprises carbonyl-containing polymerizable unsaturated monomer (b6).

31. A process as set forth in claim 2, in which the monomeric mixture (I) further comprises a compound which contains substantially no polymerizable unsaturated group.

32. Aqueous resin dispersions prepared by a process as set forth in claim 2.

33. Aqueous resin compositions which comprise the aqueous resin dispersions as set forth in claim 32.

34. Aqueous resin compositions as set forth in claim 33, which further comprise hydrazine derivatives.

35. Aqueous resin compositions as set forth in claim 33, which form hardened coating film having a transmission haze value not higher than 5.

36. Water-based paint compositions which comprise the aqueous resin compositions as set forth in claim 33.

37. Water-based paint compositions as set forth in claim 36, which further comprise titanium white at a pigment volumetric concentration within a range of 5-25%.

38. Water-based paint compositions as set forth in claim 36, which further comprise phosphoric acid-derived pigment at a pigment volumetric concentration within a range of 1-10%.

39. Water-based paint compositions as set forth in claim 36, which further comprise at least one kind of compound selected from the group consisting of nitrous acid salt, phytic acid salt, tannic acid salt and polyamine compound.

40. A coating film-forming method which comprises applying a water-based paint composition as set forth in claim 36 onto a substrate surface to be coated.

41. A coating film-forming method as set forth in claim 40, in which the surface to be coated is that of an iron substrate or a coated surface of an iron substrate.

42. Coated articles formed by the method as set forth in claim 40.

* * * * *